United States Patent
Masahiko et al.

(10) Patent No.: US 8,569,635 B2
(45) Date of Patent: Oct. 29, 2013

(54) TUBULAR WEIGHT SENSOR WITH AN INNER PROJECTION

(75) Inventors: Ohbayashi Masahiko, Fukui (JP); Motoki Ogata, Fukui (JP); Hiroaki Ishida, Fukui (JP); Takaaki Ogawa, Fukui (JP); Kazuhiro Nomura, Fukui (JP)

(73) Assignee: Panasonic Corporation, Osaka (JP)

( * ) Notice: Subject to any disclaimer, the term of this patent is extended or adjusted under 35 U.S.C. 154(b) by 458 days.

(21) Appl. No.: 13/120,284

(22) PCT Filed: Oct. 2, 2009

(86) PCT No.: PCT/JP2009/005096
§ 371 (c)(1),
(2), (4) Date: Mar. 22, 2011

(87) PCT Pub. No.: WO2010/041395
PCT Pub. Date: Apr. 15, 2010

(65) Prior Publication Data
US 2011/0168457 A1 Jul. 14, 2011

(30) Foreign Application Priority Data

Oct. 9, 2008 (JP) ................................ 2008-262525
Oct. 9, 2008 (JP) ................................ 2008-262526
Sep. 7, 2009 (JP) ................................ 2009-205471

(51) Int. Cl.
*G01B 7/00* (2006.01)
*G01L 1/00* (2006.01)
*B60R 21/015* (2006.01)
*G01G 19/12* (2006.01)

(52) U.S. Cl.
USPC ...... 177/136; 73/862.635; 180/273; 280/735; 177/211

(58) Field of Classification Search
USPC .................... 177/136, 144, 211; 73/862.635; 180/273; 280/735
See application file for complete search history.

(56) References Cited

U.S. PATENT DOCUMENTS

| | | | | |
|---|---|---|---|---|
| 3,559,474 A | * | 2/1971 | Gurol et al. | 73/862.635 |
| 3,866,157 A | * | 2/1975 | Birkholtz | 338/5 |
| 4,911,024 A | * | 3/1990 | McMaster | 73/862.045 |
| 4,932,253 A | * | 6/1990 | McCoy | 73/152.61 |
| 6,005,199 A | | 12/1999 | Harada et al. | |
| 6,711,960 B2 | | 3/2004 | Kobayashi et al. | |
| 6,768,065 B2 | * | 7/2004 | Bertenburg et al. | 177/144 |
| 6,797,892 B2 | * | 9/2004 | Golla | 177/144 |
| 6,865,961 B2 | * | 3/2005 | Wolf et al. | 73/862.69 |
| 6,969,809 B2 | * | 11/2005 | Rainey | 177/136 |
| 7,112,749 B2 | * | 9/2006 | DiPaola et al. | 177/136 |
| 2007/0084294 A1 | | 4/2007 | Kobayashi et al. | |

FOREIGN PATENT DOCUMENTS

| | | |
|---|---|---|
| JP | 04-305132 | 10/1992 |
| JP | 05-209796 | 8/1993 |
| JP | 06-207866 | 7/1994 |
| JP | 08-005475 | 1/1996 |
| JP | 11-132874 | 5/1999 |
| JP | 2002-357491 | 12/2002 |
| JP | 2005-106800 | 4/2005 |

* cited by examiner

*Primary Examiner* — Randy W Gibson
(74) *Attorney, Agent, or Firm* — McDermott Will & Emery LLP

(57) ABSTRACT

A weight sensor includes a deformable body, a first strain resistor provided on an outer side surface of the deformable body, and a pressing member applying a load to the deformable body. The deformable body includes a tubular portion having a tubular shape extending along a center axis and surrounding the center axis, and a projection projecting from an inner surface of the tubular portion. The pressing member moves along the center axis so as to apply a moment to the tubular portion. The resistances of the strain resistors change greatly, allowing the weight sensor to measure a load with high sensitivity.

11 Claims, 22 Drawing Sheets

US 8,569,635 B2

TUBULAR WEIGHT SENSOR WITH AN INNER PROJECTION

RELATED APPLICATIONS

This application is the U.S. National Phase under 35 U.S.C. §371 of International Application No. PCT/JP2009/005096, tiled on Oct. 2, 2009, which in turn claims the benefit of Japanese Application No. 2008-262525, filed on Oct. 9, 2008, Japanese Application No. 2008-262526, filed on Oct. 9, 2008 and Japanese Application No. 2009-205471, filed on Sep. 7, 2009, the disclosures of which Applications are incorporated by reference herein.

TECHNICAL FIELD

The present invention relates to a weight sensor for measuring a load applied to an object, such as a vehicle seat.

BACKGROUND ART

FIG. 25 is a perspective view of conventional weight sensor 501 disclosed in Patent Literature 1. FIG. 26 is a view of deformable body 101 of weight sensor 501. FIG. 27 is a circuit diagram of weight sensor 501.

Deformable body 101 includes an outer side surface having a circular-cylindrical shape extending along center axis 501A. The outer side surface of deformable body 101 includes a pair of transversely extending strain resistor elements 102, a pair of longitudinally extending strain resistor elements 103, power supply electrode 104, ground (GND) electrode 105, and output electrodes 106. The outer side surface of deformable body 101 further includes circuit pattern 107 for electrically connecting these components, thereby forming a bridge circuit shown in FIG. 27.

The following is a description of the operation of conventional weight sensor 501.

FIG. 28 is a side sectional view of object 502 to which weight sensor 501 is attached. Weight sensor 501 is held between parts of mounting member 108 along center axis 501A. When a load is applied to pressing member 109, and hence a compressive force is applied to deformable body 101 in the axial direction, the resistances of the pair of longitudinally extending strain resistor elements 103 decrease, and the resistances of the pair of transversely extending strain resistor elements 102 increase. These strain resistor elements 103 and 102 extending longitudinally and transversely form the bridge circuit together with power supply electrode 104, GND electrode 105, output electrodes 106, and circuit pattern 107. Therefore, output electrodes 106 output their output signals according to the compressive force applied to deformable body 101. The output signal is output to an external circuit through lead wires which are electrically connected to power supply electrode 104, GND electrode 105, and output electrodes 106. Thus, weight sensor 501 outputs the applied load as an electrical signal.

In conventional weight sensor 501, a compressive force is applied to deformable body 101 along center axis 501A of the cylindrical surface. As a result, deformable body 101 itself prevents deformation of strain resistor elements 102 and 103. This makes the resistances of strain resistor elements 102 and 103 less likely to be changed, thereby reducing an output signal which is output from weight sensor 501 according to the compressive force.

FIGS. 29 and 30 are an exploded perspective view and a sectional side view of conventional weight sensor 601 disclosed in Patent Literature 2, respectively. FIG. 31 is a bottom view of insulating board 311 of weight sensor 601.

Insulating board 311 has substantially a square shape, and is made of stainless steel containing about 0.1 wt % of nickel. As shown in FIG. 31, power supply electrode 312, a pair of output electrodes 313, GND electrode 314, four compressive-side strain resistor elements 315, four tensile-side strain resistor elements 316, and circuit pattern 317 are provided a lower surface of insulating board 311. Power supply electrode 312, output electrodes 313, GND electrode 314, and circuit pattern 317 are made of silver. Power supply electrode 312, the pair of output electrodes 313, GND electrode 314, four compressive-side strain resistor elements 315, and four tensile-side strain resistor elements 316 are electrically connected via circuit pattern 317 so as to form a bridge circuit together. Fixing holes 318 extending between upper and lower surfaces of insulating board 311 are provided near four corners of insulating board 311. Detection hole 319 extending between the upper and lower surfaces of insulating board 311 is provided in a center of insulating board 311. Weight sensor 601 further includes pressing member 320 made of stainless steel containing about 4 wt % of nickel. Pressing member 320 includes contact part 321 and external thread 322. Contact part 321 presses around the upper end of detection hole 319 of insulating board 311. External thread 322 is formed in an outer side surface of pressing member 320.

Anti-rotation projection 323 is provided on an outer side surface of pressing member 320 at the center in a longitudinal direction of pressing part 320. External thread 324 for mounting is provided in the upper part of an outer side surface of pressing member 320. Weight sensor 601 further includes mounting member 325 which is made of metal. Insertion hole 326 into which pressing member 320 is inserted is provided substantially in a center of mounting member 325.

FIG. 32 is a bottom view of mounting member 325. Stopper 327 is formed provided on a lower surface of mounting member 325 around insertion hole 326 stopper 327 by cutting or forging.

Fixing holes 328 extending between upper and lower surfaces of mounting member 325 is provided near four corners of mounting member 325. Sandwiching contact parts 329 are provided on the lower surface of mounting member 325 around fixing holes 328, and project from the lower surface so as to be flush with each other. Hexagonal locking part 330 is provided on the upper surface of mounting member 325, and has a step around insertion hole 326. Anti-rotation projection 323 of pressing member 320 is locked into locking part 330. External thread 322 of pressing member 320 passes through insertion hole 326 of mounting member 325 and is inserted into detection hole 319 of insulating board 311. External thread 322 extending downward is screwed with fixing member 331, which is a nut, so that pressing member 320 can be fixed to mounting member 325.

FIG. 33 is a top view of mounting member 332 made of metal. Stopper hole 333 is provided substantially in the upper surface of mounting member 332 at its center and extends downward from the upper surface. Stopper hole 333 accommodates the lower part of external thread 322 of pressing member 320. Four stoppers 334 are formed on the upper surface of mounting member 332 around stopper hole 333 by forging. Strain resistor elements 315 and 316 on insulating board 311 face the area on mounting member 332 excluding four stoppers 334.

Fixing holes 335 extending between the upper and lower surfaces of mounting member 332 is provided near the four corners of mounting member 332. Sandwiching contact parts 336 are provided on mounting member 332 around four fixing holes 335, and project from the upper surface so as to be flush with each other. Weight sensor 601 further includes fixing members 337, four screws, passing through four fixing holes 328 of mounting member 325, four fixing holes 318 of insulating board 311, and four fixing holes 335 of mounting member 332. Fixing members 337 are screwed with nuts 338 so as to sandwich insulating board 311 between sandwiching contact parts 329 of mounting member 325 and sandwiching contact parts 336 of mounting member 332. The area around detection hole 319 of insulating board 311 can be displaced with respect to mounting members 325 and 332 in the vertical direction.

Weight sensor 601 further includes circuit board 339 having integrated circuit (IC) 340 mounted on a lower surface thereof. IC 340 is electrically connected to power supply electrode 312, output electrodes 313, and GND electrode 314 on insulating board 311 via conductive member 341, which is made of gold wire and silicon rubber.

Weight sensor 601 further includes case 342 which includes connector part 343 projecting outward. Six connector terminals 344 electrically connected to IC 340 are provided in connector part 343.

An operation of conventional weight sensor 601 will be described below.

When a load is applied to pressing member 320 from above, the load causes distortion on the surface of insulating board 311. The distortion causes four compressive-side strain resistor elements 315 on the lower surface of insulating board 311 to receive a compressive stress, and four tensile-side strain resistor elements 316 to receive a tensile stress. These stresses change the resistances of compressive-side strain resistor elements 315 and tensile-side strain resistor elements 316. Strain resistor elements 315 and 316 together form a bridge circuit. Therefore, the changes in the resistances of strain resistor elements 315 and 316 are output to an external computer from output electrodes 313. The computer calculates the load applied to insulating board 311 based on the changes in the resistances.

When an excessively large load is applied to pressing member 320 from above, stoppers 334 of mounting member 332 contact insulating board 311, thereby preventing plastic deformation of insulating board 311. Similarly, when an excessively large tensile load is applied to pressing member 320, stopper 327 of mounting member 325 contacts insulating board 311, thereby preventing plastic deformation of insulating board 311.

Stoppers 327 and 334 are formed by cutting or forging, and raise manufacturing cost, accordingly causing conventional weight sensor 601 to be expensive.

Citation List

Patent Literatures
Patent Literature 1: Japanese Patent Laid-Open Publication No. 06-207866
Patent Literature 2: Japanese Patent Laid-Open Publication No. 2005-106800

SUMMARY OF THE INVENTION

A weight sensor includes a deformable body, a first strain resistor provided on an outer side surface of the deformable body, and a pressing member applying a load to the deformable body. The deformable body includes a tubular portion having a tubular shape extending along a center axis and surrounding the center axis, and a projection projecting from an inner surface of the tubular portion. The pressing member moves along the center axis so as to apply a moment to the tubular portion.

The resistances of the strain resistors change greatly, allowing the weight sensor to measure a load with high sensitivity.

DETAILED DESCRIPTION OF PREFERRED EMBODIMENTS

Exemplary Embodiment 1

Figures 1, 2:
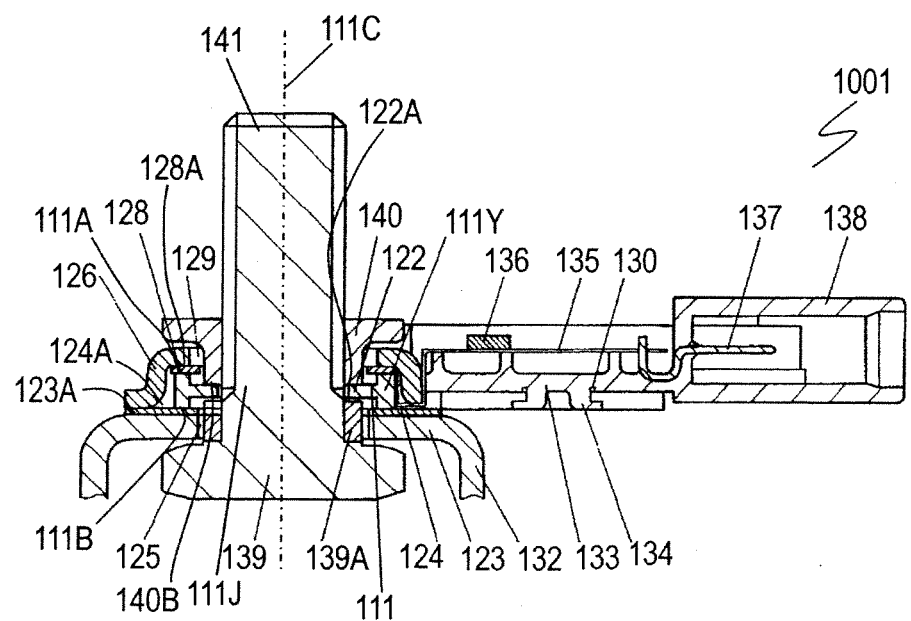
FIG. 1 is a side sectional view of a weight sensor according to Exemplary Embodiment 1 of the present invention.
FIG. 2 is a side view of the weight sensor according to Embodiment 1.
Figure 3A:
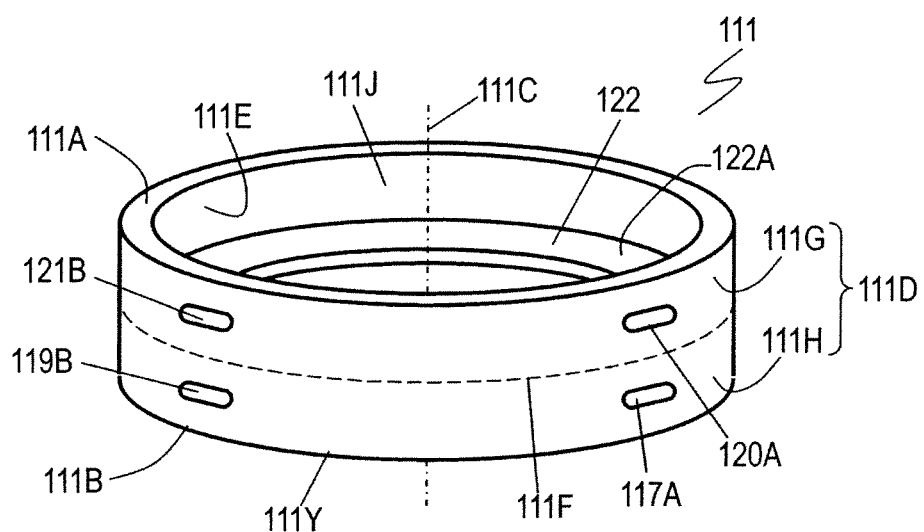
FIG. 3A is a perspective view of a deformable body of the weight sensor according to Embodiment 1.
Figure 3B:
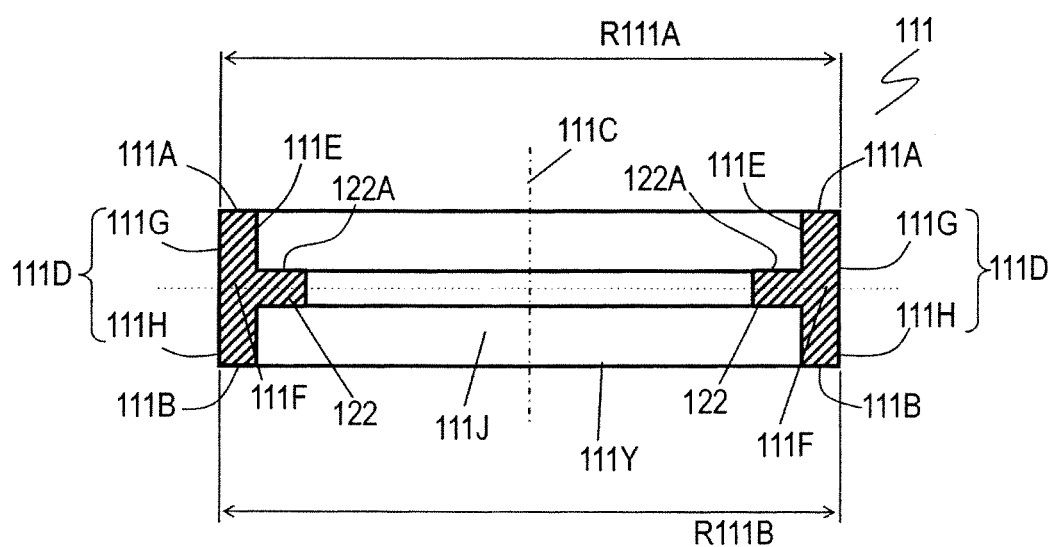
FIG. 3B is a sectional view of the deformable body shown in FIG. 3A.
Figure 3C:
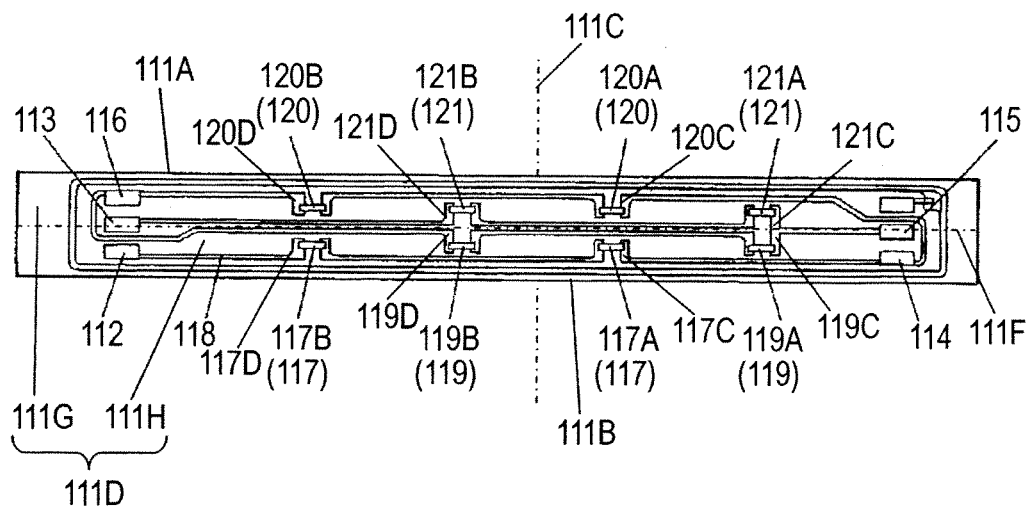
FIG. 3C is a developed view of a tubular portion of the deformable body of the weight sensor according to Embodiment 1.
Figure 4:
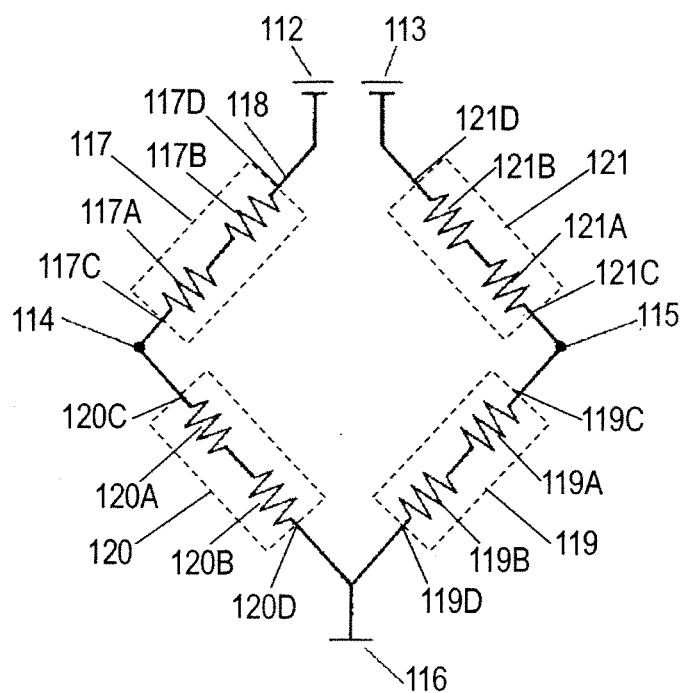
FIG. 4 is a circuit diagram of the weight sensor according to Embodiment 1.

FIGS. 1 and 2 are a side sectional view and a side view of weight sensor 1001 according to a first exemplary embodiment of the present invention, respectively. FIG. 3A is a perspective view of deformable body 111 of weight sensor 1001. FIG. 3B is a sectional view of deformable body 111. FIG. 3C is a developed view of tubular portion 111Y of deformable body 111. FIG. 4 is a circuit diagram of weight sensor 1001.

Weight sensor 1001 includes lower mounting part 123 made of metal and having hole 125 therein. Lower mounting part 123 supports lower end 111B of deformable body 111 via elastic body 124 made of a rubber sheet.

Weight sensor 1001 further includes upper mounting part 126 made of metal and having hole 129 and caulking hole 130 therein. Upper mounting part 126 supports upper end 111A of deformable body 111 via elastic body 128 made of a rubber sheet. Lower mounting part 123 and upper mounting part 126 together constitute support member 132. Weight sensor 1001 further includes resin case 133 which has caulking portion 134. Caulking portion 134 is inserted into caulking hole 130 of upper mounting part 126, and then the tip of caulking portion 134 is caulked so as to fix support member 132 to case 133. Case 133 accommodates circuit board 135 made of polyimide.

As shown in FIGS. 3A and 3B, deformable body 111 includes tubular portion 111Y which has a tubular shape (a circular-tubular shape according to Embodiment 1) extending along center axis 111C and surrounding center axis 111C. Tubular portion 111Y has therein through-hole 111J extending along center axis 111C. In Embodiment 1, deformable body 111 is disposed such that center axis 111C extends in a vertical direction. Tubular portion 111Y has upper end 111A and lower end 111B which are opposite to each other along center axis 111C. Tubular portion 111Y further has outer side surface 111D and inner side surface 111E opposite to outer side surface 111D. Outer side surface 111D faces an outside of the tubular shape. Inner surface 111E faces center axis 111C. Deformable body 111 further includes projection 122 projecting from inner surface 111E of tubular portion 111Y toward center axis 111C. Deformable body 111 is made of a plate made of rigid but deformable material, and its surface (at least outer side surface 111D) is insulating. In Embodiment 1, deformable body 111 includes a plate made of metal, such as ferrite stainless steel, and a glass layer provided on the surface (outer side surface 111D) of the metal plate. Power supply electrodes 112 and 113, output electrodes 114 and 115, and ground (GND) electrode 116 which are disposed close to each other and made of Ag are provided on outer side surface 111D. Intermediate circumference 111F at which tubular portion 111Y crosses a surface perpendicular to center axis 111C between upper and lower ends 111A and 111B is defined in tubular portion 111Y. In Embodiment 1, ends 111A and 111B are perpendicular to center axis 111C, and intermediate circumference 111F is positioned at the middle between ends 111A and 111B. Intermediate circumference 111F divides outer side surface 111D of tubular portion 111Y into upper outer side surface 111G and lower outer side surface 111H. In other words, upper outer side surface 111G is located between intermediate circumference 111F and upper end 111A. Lower outer side surface 111H is located between intermediate circumference 111F and lower end 111B.

Projection 122 projects toward center axis 111C from peripheral intermediate portion 111F of inner surface 111E of tubular portion 111Y Lower-side strain resistors 117 and 119 are provided on lower outer side surface 111H. Lower-side strain resistor 117 has ends 117C and 117D, and includes strain resistor elements 117A and 117B connected in series between ends 117C and 117D. Strain resistor elements 117A and 117B have resistances changing depending on the geometric distortion generated by a stress applied to the elements. Therefore, the resistance between ends 117C and 117D of lower-side strain resistor 117 changes depending on the geometric distortion generated by the stress applied to strain resistor elements 117A and 117B, that is, strain resistor 117. Lower-side strain resistor 119 has ends 119C and 119D, and includes strain resistor elements 119A and 119B connected in series between ends 119C and 119D. Strain resistor elements 119A and 119B have resistances changing depending on the geometric distortion generated by a stress applied to the elements.

Therefore, the resistance between ends 119C and 119D of lower-side strain resistor 119 changes depending on the geometric distortion generated by the stress applied to strain resistor elements 119A and 119B, that is, strain resistor 119. End 117D of lower-side strain resistor 117 is electrically connected to power supply electrode 112 via circuit pattern 118, and end 117C is connected to output electrode 114 via circuit pattern 118. End 119C of lower-side strain resistor 119 is electrically connected to output electrode 115 via circuit pattern 118, and end 119D is electrically connected to GND electrode 116 via circuit pattern 118.

Upper-side strain resistors 120 and 121 are provided on upper outer side surface 111G. Upper-side strain resistor 120 has ends 120C and 120D, and includes strain resistor elements 120A and 120B connected in series between ends 120C and 120D. Strain resistor elements 120A and 120B have resistances changing depending on the geometric distortion generated by a stress applied to the elements. Therefore, the resistance between ends 120C and 120D of upper-side strain resistor 120 changes depending on the geometric distortion generated by the stress applied to strain resistor elements 120A and 120B, that is, strain resistor 120. Upper-side strain resistor element 121 has ends 121C and 121D, and includes strain resistor elements 121A and 121B connected in series between ends 121C and 121D. Strain resistor elements 121A and 121B have resistances changing depending on the geometric distortion generated by a stress applied to the elements. Therefore, the resistance between ends 121C and 121D of upper-side strain resistor 121 changes depending on the geometric distortion generated by the stress applied to strain resistor elements 121A and 121B, that is, strain resistor 121. End 120D of upper-side strain resistor 120 is electrically connected to GND electrode 116 via circuit pattern 118, and end 120C is connected to output electrode 114 via circuit pattern 118. End 121D of upper-side strain resistor 121 is electrically connected to power supply electrode 113 via circuit pattern 118, and end 121C is electrically connected to output electrode 115 via circuit pattern 118. Lower-side strain resistors 117 and 119 and upper-side strain resistors 120 and 121 together constitute a bridge circuit.

Strain resistor elements 117A and 117B and strain resistor elements 119 and 119B are arranged alternately in a circumferential direction of outer side surface 111D of deformable body 111 perpendicular to center axis 111C. In other words, strain resistor element 117A is located between strain resistor elements 119A and 119B, and strain resistor element 119A is located between strain resistor elements 117A and 117B in the circumferential direction of outer side surface 111D. Strain resistor element 117B is located between strain resistor elements 119A and 119B, and strain resistor element 119B is located between strain resistor elements 117A and 117B in the circumferential direction of outer side surface 111D.

Strain resistor elements 120A and 120B and strain resistors 121A and 121B are arranged alternately in the circumferential direction of outer side surface 111D of deformable body 111 perpendicular to center axis 111C. In other words, strain resistor element 120A is located between strain resistor elements 121A and 121B, and strain resistor element 121A is located between strain resistor elements 120A and 120B in the circumferential direction of outer side surface 111D. Strain resistor element 120B is located between strain resistor elements 121A and 121B, and strain resistor element 121B is located between strain resistor elements 120A and 120B in the circumferential direction of outer side surface 111D. As shown in FIG. 3C, strain resistor elements 120A, 120B, 121A, and 121B are located above strain resistor elements 117A, 117B, 119A, and 119B, respectively, that is, in the direction parallel to center axis 111C.

Circuit board 135 shown in FIG. 1 is electrically connected to power supply electrodes 112 and 113, output electrodes 114 and 115, and GND electrode 116 which are formed on outer side surface 111D of deformable body 111. Processing circuit 136 implemented by an integrated circuit (IC) is mounted onto circuit board 135. Processing circuit 136 processes signals output from output electrodes 114 and 115 of the bridge circuit which is composed of lower-side strain resistors 117 and 119, upper-side strain resistors 120 and 121, and circuit pattern 118 formed on deformable body 111. Case 133 includes connector part 138 having connector terminals 137. Connector terminals 137 electrically connected to circuit board 135 output signals outside.

A method for manufacturing weight sensor 1001 of Embodiment 1 will be described below.

First, a glass paste is printed on the upper surface of a metal plate, such as a stainless steel plate, and then, sintered for about ten minutes at a temperature ranging from 550° C. to 850° C. so as to form deformable body 111.

Next, a silver paste is printed on outer side surface 111D of deformable body 111, and then sintered for about ten minutes at a temperature ranging from 550° C. to 850° C. so as to form power supply electrodes 112 and 113, output electrodes 114 and 115, GND electrode 116, and circuit pattern 118 on outer side surface 111D of deformable body 111.

Next, a metal glaze paste is printed on outer side surface 111D of deformable body 111, dried for about ten minutes at a temperature ranging from 150° C. to 250° C., and then sintered for about ten minutes at about 850° C. so as to form strain resistor elements 117A, 117B, 119A, 119B, 120A, 120B, 121A, and 121B, thereby forming lower-side strain resistors 117 and 119 and upper-side strain resistors 120 and 121.

Next, elastic body 124 is bonded to upper surface 123A of lower mounting part 123, and deformable body 111 is placed on upper surface 124A of elastic body 124.

Then, elastic body 128 is placed on upper end 111A of deformable body 111, and upper mounting part 126 is bonded to upper surface 128A of elastic body 128.

Figure 5:
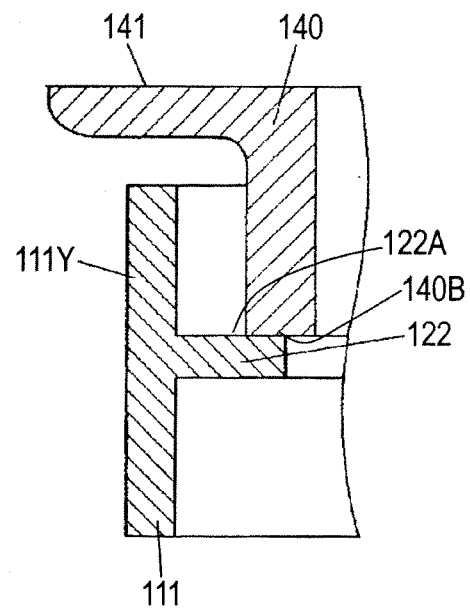
FIG. 5 is an enlarged side sectional view of the weight sensor according to Embodiment 1.
Figure 6:
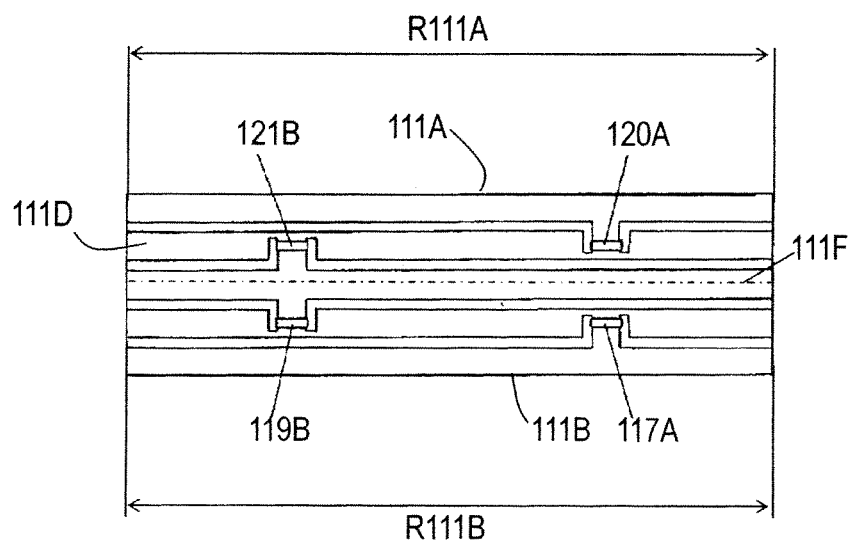
FIG. 6 is a side view of the weight sensor according to Embodiment 1.

An operation of weight sensor 1001 according Embodiment 1 will be described below. FIG. 5 is an enlarged side sectional view of weight sensor 1001 for illustrating deformable body 111 and pressing member 141. FIG. 6 is a side view of deformable body 111.

First, bolt 139 with collar 139A is inserted from the lower side of lower mounting part 123 of support member 132 into hole 125 of lower mounting part 123, through-hole 111J of deformable body 111, and hole 129 of upper mounting part 126.

Next, bolt 139 is screwed with nut 140 at a position where lower surface 140B of nut 140 contacts upper surface 122A of projection 122 of deformable body 111. Bolt 139 and nut 140 together constitute pressing member 141. In this situation, as shown in FIGS. 5 and 6, pressing member 141 contacts projection 122 of deformable body 111, but no load is applied to deformable body 111.

Predetermined voltages (5V according to Embodiment 1) are applied to power supply electrodes 112 and 113, and GND electrode 116 is grounded.

Figure 7:
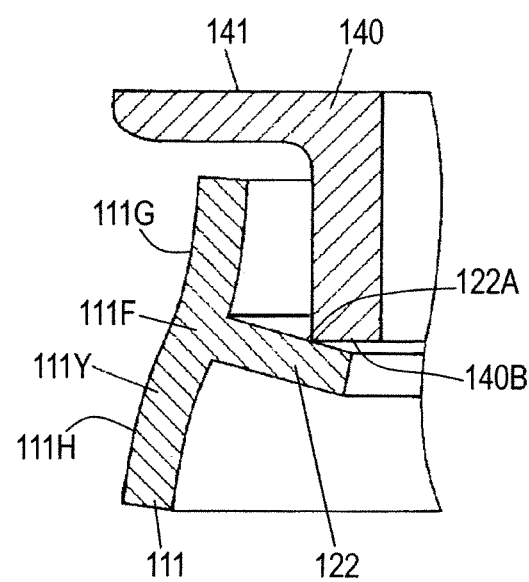
FIG. 7 is a side sectional view of the weight sensor according to Embodiment 1.
Figure 8:
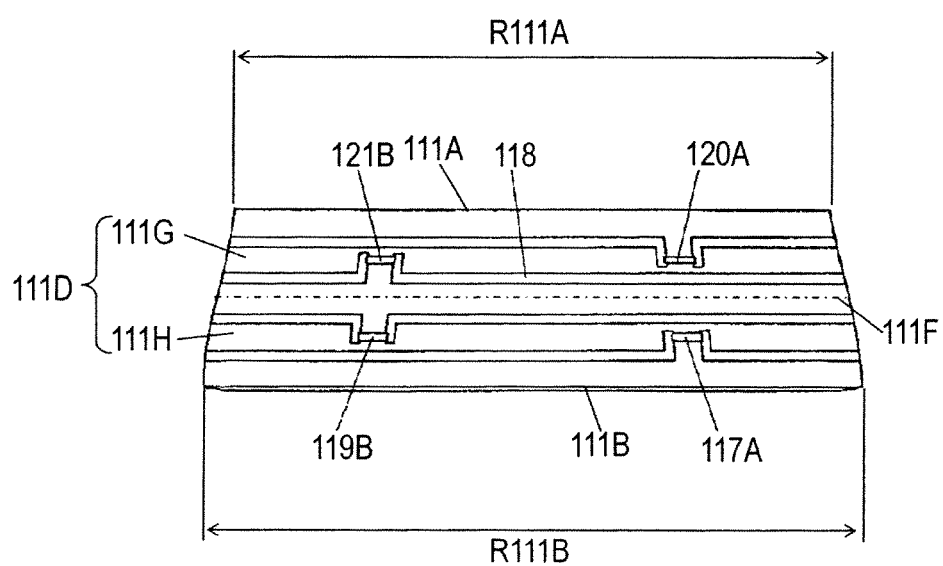
FIG. 8 is a side view of the weight sensor according to Embodiment 1.

FIG. 7 is an enlarged side sectional view of weight sensor 1001 having pressing member 141 apply a load to deformable body 111. FIG. 8 is a side view of outer side surface 111D of deformable body 111 having a load is applied to deformable body 111. When applied with a load along center axis 111C from above, pressing member 141 presses upper surface 122A of projection 122 of deformable body 111 downward. As a result, pressing member 141 applies a shear load parallel to center axis 111C to tubular portion 111Y via projection 122. More specifically, pressing member 141 presses deformable body 111 in parallel to center axis 111C so that tubular portion 111Y and projection 122 are urged and displaced in directions relatively opposite to each other. The shear load applies a moment to outer side surface 111D of tubular deformable body 111 linked to projection 122. The moment decreases radius R111A of upper end 111A of deformable body 111, and increases radius R111B of lower end 111B as shown in FIG. 8. The moment displaces upper end 111A and lower end 111B of tubular portion 111Y in directions relatively opposite to each other in a radial direction about center axis 111C. The decrease in radius R111A of upper end 111A of tubular portion 111Y contracts upper outer side surface 111G of outer side surface 111D. The increase in radius R111B of lower end 111B of tubular portion 111Y of deformable body 111 expands lower outer side surface 111H of outer side surface 111D. This decreases the resistances of upper-side strain resistors 120 and 121 (strain resistor elements 120A, 120B, 121A, and 121B) formed on upper outer side surface 111G of outer side surface 111D, and increases the resistances of lower-side strain resistors 117 and 119 (strain resistor elements 117A, 117B, 119A, and 119B) formed on lower outer side surface 111H of outer side surface 111D. This changes the voltage between output electrodes 114 and 115 of the bridge circuit which is composed of strain resistors 117, 119, 120, and 121 shown in FIG. 4. The voltage is processed by processing circuit 136 so as to measure the load applied to deformable body 111.

As described above, in weight sensor 1001 of Embodiment 1, pressing member 141 for pressing projection 122 of deformable body 111 moves along center axis 111C of deformable body 111, thereby applying a moment to deformable body 111. This moment easily causes outer side surface 111D of deformable body 111 to deform. As a result, the resistances of strain resistors 117, 119, 120, and 121 formed on outer side surface 111D are easily changed so as to greatly change the voltage between output electrodes 114 and 115 of the bridge circuit. This increases the sensitivity of a signal to be output from weight sensor 1001.

Support member 132 is composed of upper mounting part 126 and lower mounting part 123. Elastic body 128 provided between upper mounting part 126 and deformable body 111 facilitates the change in radius R111A of upper end 111A of tubular portion 111Y of deformable body 111. This causes upper outer side surface 111G of outer side surface 111D of deformable body 111 (tubular portion 111Y) to easily deform, accordingly increasing the sensitivity of the signal output from weight sensor 1001.

Elastic body 124 provided between lower mounting part 123 and deformable body 111 facilitates the change in radius R111B of lower end 111B of tubular portion 111Y of deformable body 111. This causes lower outer side surface 111H of outer side surface 111D of deformable body 111 (tubular portion 111Y) to easily deform, thereby increasing the sensitivity of the signal output from weight sensor 1001.

Exemplary Embodiment 2

Figure 9:
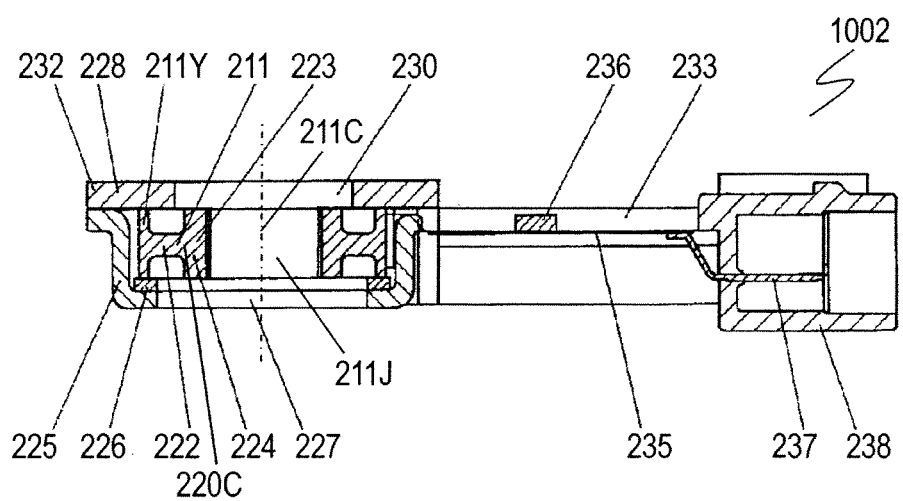
FIG. 9 is a side sectional view of a weight sensor according to Exemplary Embodiment 2 of the present invention.
Figure 10:
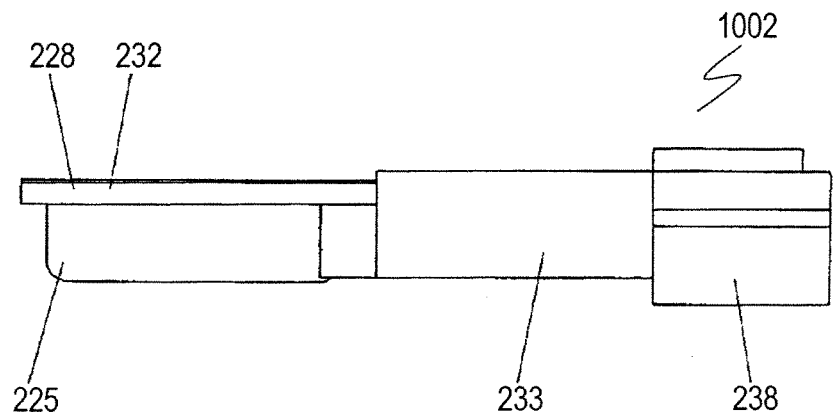
FIG. 10 is a side view of the weight sensor according to Embodiment 2.
Figure 11A:
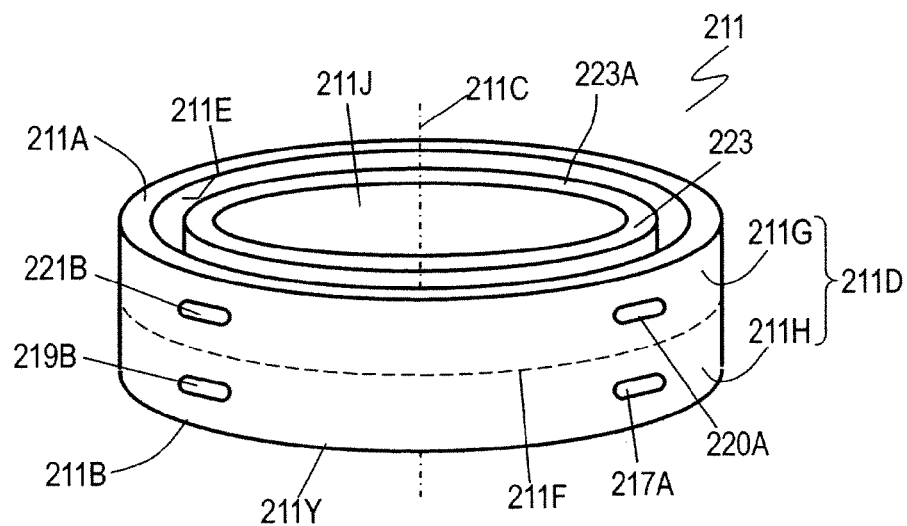
FIG. 11A is a perspective view of a deformable body of the weight sensor according to Embodiment 2.
Figure 11B:
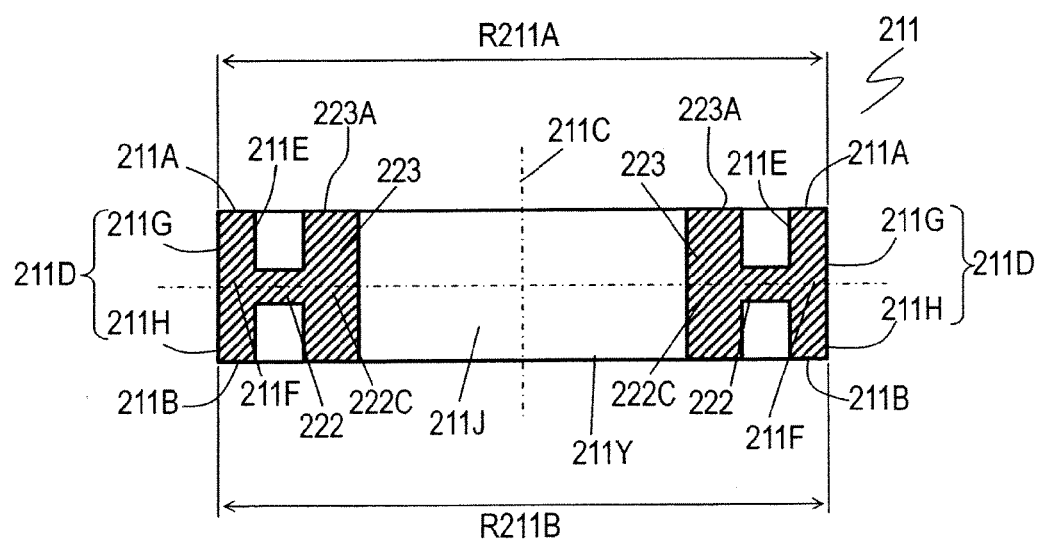
FIG. 11B is a sectional view of the deformable body shown in FIG. 11A.
Figure 11C:
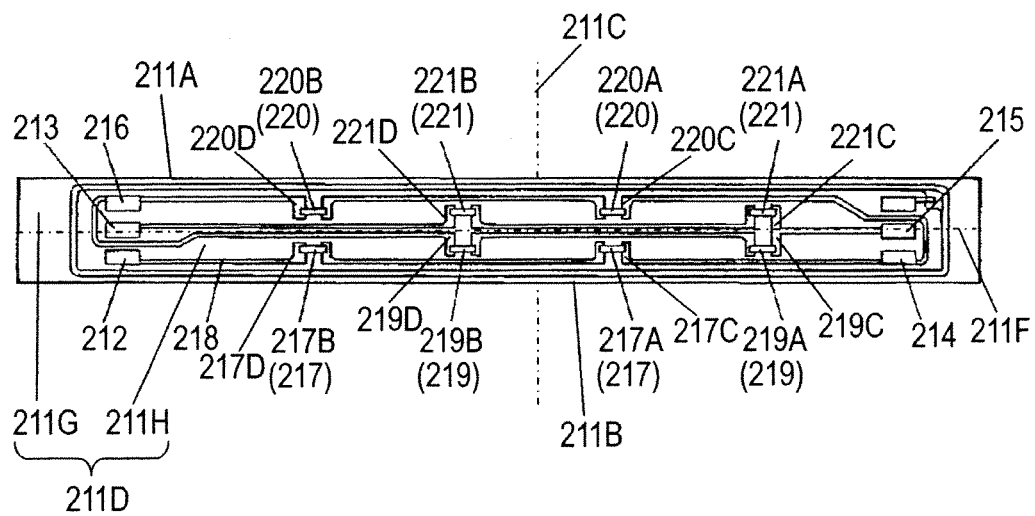
FIG. 11C is a developed view of a tubular portion of the deformable body of the weight sensor according to Embodiment 2.
Figure 12:
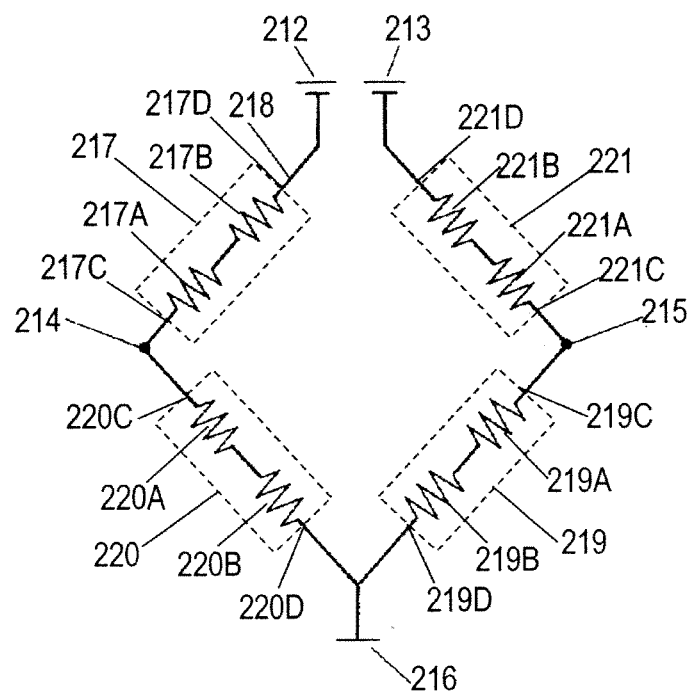
FIG. 12 is a circuit diagram of the weight sensor according to Embodiment 2.

FIGS. 9 and 10 are a side sectional view and a side view of weight sensor 1002 according to Exemplary Embodiment 2 of the present invention, respectively. FIG. 11A is a perspective view of deformable body 211 of weight sensor 1002. FIG. 11B is a sectional view of deformable body 211. FIG. 11C is a developed view of tubular portion 211Y of deformable body 211. FIG. 12 is a circuit diagram of weight sensor 1002.

Lower pressing portion 225 made of metal has hole 227 therein. Lower pressing portion 225 supports lower end 211B of tubular portion 211Y of deformable body 211 via elastic body 226 made of a rubber sheet. Upper pressing portion 228 made of metal has hole 230 and a caulking hole therein. Upper pressing portion 228 contacts and supports upper end 211A of tubular portion 211Y of deformable body 211. Lower pressing portion 225 and upper pressing portion 228 together constitute pressing member 232. Case 233 made of resin has a caulking portion. The caulking portion is inserted to into the caulking hole of upper pressing portion 228, and then, the tip of the caulking portion is caulked so as to fix pressing member 232 to case 233. Case 233 accommodates circuit board 235 made of polyimide. Recess 225C provided in lower pressing portion 225 opens at upper surface 225A, and has bottom 225D.

As shown in FIGS. 11A and 11B, deformable body 211 includes tubular portion 211Y having a tubular shape (a circular cylindrical shape according to Embodiment 2) extending along and around center axis 211C. Tubular portion 211Y has through-hole 211J therein extending along center axis 211C. In Embodiment 2, deformable body 211 is disposed so that center axis 211C extends in a vertical direction. Tubular portion 211Y has upper end 211A and lower end 211B opposite to each other along center axis 211C. Tubular portion 211Y further has outer side surface 211D on the outside of the cylindrical shape, and inner surface 211E which is opposite to outer side surface 211D and faces center axis 211C. Deformable body 211 includes projection 222 projecting from inner surface 211E of tubular portion 211Y toward center axis 211C. Deformable body 211 is made of a plate made of a hard but deformable material, and has a surface which has an insulating property, at least outer side surface 211D has an insulating property. According to Embodiment 2, deformable body 211 includes a metal plate, such as a ferrite stainless steel plate, and a glass layer formed on a surface (outer side surface 211D) of the metal plate. Power supply electrodes 212 and 213, output electrodes 214 and 215, and ground (GND) electrode 216, are provided on outer side surface 211D, are disposed close to each other, and made of Ag. In tubular portion 211Y, the position which is between upper and lower ends 211A and 211B and at which tubular portion 211Y crosses a surface perpendicular to center axis 211C is defined as intermediate circumference 211F. According to Embodiment 2, ends 211A and 211B are perpendicular to center axis 211C, and intermediate circumference 211F is the middle between ends 211A and 211B. Intermediate circumference 211F divides outer side surface 211D of tubular portion 211Y into upper outer side surface 211G and lower outer side surface 211H. In other words, upper outer side surface 211G is located between intermediate circumference 211F and upper end 211A. Lower outer side surface 211H is located between intermediate circumference 211F and lower end 211B.

Projection 222 projects toward center axis 211C from inner surface 211E of intermediate circumference 211F of tubular portion 211Y Lower-side strain resistors 217 and 219 are provided on lower outer side surface 211H. Lower-side strain resistor 217 has ends 217C and 217D, and is composed of strain resistor elements 217A and 217B connected in series between ends 217C and 217D. Strain resistor elements 217A and 217B have resistances changing depending on the geometric distortion generated by a stress applied to the resistor elements. Therefore, the resistance between ends 217C and 217D of lower-side strain resistor 217 changes depending on the geometric distortion generated by the stress applied to strain resistor elements 217A and 217B, that is, strain resistor 217. Lower-side strain resistor 219 has ends 219C and 219D, and is composed of strain resistor elements 219A and 219B connected in series between ends 219C and 219D. Strain resistor elements 219A and 219B have resistances changing depending on the geometric distortion generated by a stress applied to the resistor elements. Therefore, the resistance between ends 219C and 219D of lower-side strain resistor 219 changes depending on the geometric distortion generated by the stress applied to strain resistor elements 219A and 219B, that is, strain resistor 219. End 217D of lower-side strain resistor 217 is electrically connected to power supply electrode 212 via circuit pattern 218, and end 217C is connected to output electrode 214 via circuit pattern 218. End 219C of lower-side strain resistor 219 is electrically connected to output electrode 215 via circuit pattern 218, and end 219D is electrically connected to GND electrode 216 via circuit pattern 218.

Upper-side strain resistors 220 and 221 are provided on upper outer side surface 211G. Upper-side strain resistor 220 has ends 220C and 220D, and is composed of strain resistor elements 220A and 220B connected in series between ends 220C and 220D. Strain resistor elements 220A and 220B have resistances changing depending on the geometric distortion generated by a stress applied to the resistor elements.

Therefore, the resistance between ends 220C and 220D of upper-side strain resistor 220 changes depending on the geometric distortion generated by the stress applied to strain resistor elements 220A and 220B, that is, strain resistor 220. Upper-side strain resistor 221 has ends 221C and 221D, and is composed of strain resistor elements 221A and 221B connected in series between ends 221C and 221D. Strain resistor elements 221A and 221B have resistances changing depending on the geometric distortion generated by a stress applied to the resistor elements. Therefore, the resistance between ends 221C and 221D of upper-side strain resistor 221 changes depending on the geometric distortion generated by the stress applied to strain resistor elements 221A and 221B, that is, strain resistor 221. End 220D of upper-side strain resistor 220 is electrically connected to GND electrode 216 via circuit pattern 218, and end 220C is connected to output electrode 214 via circuit pattern 218. End 221D of upper-side strain resistor 221 is electrically connected to power supply electrode 213 via circuit pattern 218, and end 221C is electrically connected to output electrode 215 via circuit pattern 218. Lower-side strain resistors 217 and 219 and upper-side strain resistors 220 and 221 together constitute a bridge circuit.

Strain resistor elements 217A and 217B and resistor elements 219A and 219B are arranged alternately in a circumferential direction of outer side surface 211D of deformable body 211 perpendicular to center axis 211C.

In other words, strain resistor element 217A is located between strain resistor elements 219A and 219B, and strain resistor element 219A is located between strain resistor elements 217A and 217B on outer side surface 211D in the circumferential direction. Strain resistor element 217B is located between strain resistor elements 219A and 219B, and strain resistor element 219B is located between strain resistor elements 217A and 217B on outer side surface 211D in the circumferential direction.

Strain resistor elements 220A and 220B and resistor elements 221A and 221B are arranged alternately in the circumferential direction of outer side surface 211D of deformable body 211 perpendicular to center axis 211C.

In other words, strain resistor element 220A is located between strain resistor elements 221A and 221B, and strain resistor element 221A is located between strain resistor elements 220A and 220B in the circumferential direction of outer side surface 211D. Strain resistor element 220B is located between strain resistor elements 221A and 221B, and strain resistor element 221B is located between strain resistor elements 220A and 220B in the circumferential direction of outer side surface 211D. As shown in FIG. 11C, strain resistor elements 220A, 220B, 221A, and 221B are located above strain resistor elements 217A, 217B, 219A, and 219B, respectively, that is, in a direction parallel to center axis 211C.

Deformable body 211 further includes retained portion 223 provided at tip 222C of projection 222. Retained portion 223 has a larger width in a direction of center axis 211C than projection 222. Retained portion 223 and projection 222 together constitute fixing part 224.

Circuit board 235 shown in FIG. 9 is electrically connected to power supply electrodes 212 and 213, output electrodes 214 and 215, and GND electrode 216 which are formed on outer side surface 211D of deformable body 211. Circuit board 235 includes processing circuit 236 implemented by an integrated circuit (IC). Processing circuit 236 processes signals output from output electrodes 214 and 215 of the bridge circuit which is composed of lower-side strain resistors 217 and 219, upper-side strain resistors 220 and 221, and circuit pattern 218 formed on deformable body 211. Case 233 includes connector part 238 having connector terminals 237. Connector terminals 237 electrically connected to circuit board 235 output signals outside.

A method for manufacturing weight sensor 1002 according to Embodiment 2 will be described below.

Deformable body 211 is manufactured using the same materials and methods as deformable body 111 and strain resistors 117, 119, 120, and 121 according to Embodiment 1. Deformable body 211 includes strain resistors 217, 219, 220, and 221; power supply electrodes 212 and 213; output electrodes 214 and 215; GND electrode 216; and circuit pattern 218 which are provided on outer side surface 211D.

Next, elastic body 226 is bonded to bottom 225D of recess 225C which opens at upper surface 225A of lower pressing portion 225. Then, tubular portion 211Y of deformable body 211 is placed on upper surface 226A of elastic body 226.

Next, upper pressing portion 228 is bonded to upper end 211A of tubular portion 211Y of deformable body 211, and upper pressing portion 228 is bonded to upper surface 225A of lower pressing portion 225.

Figure 13:
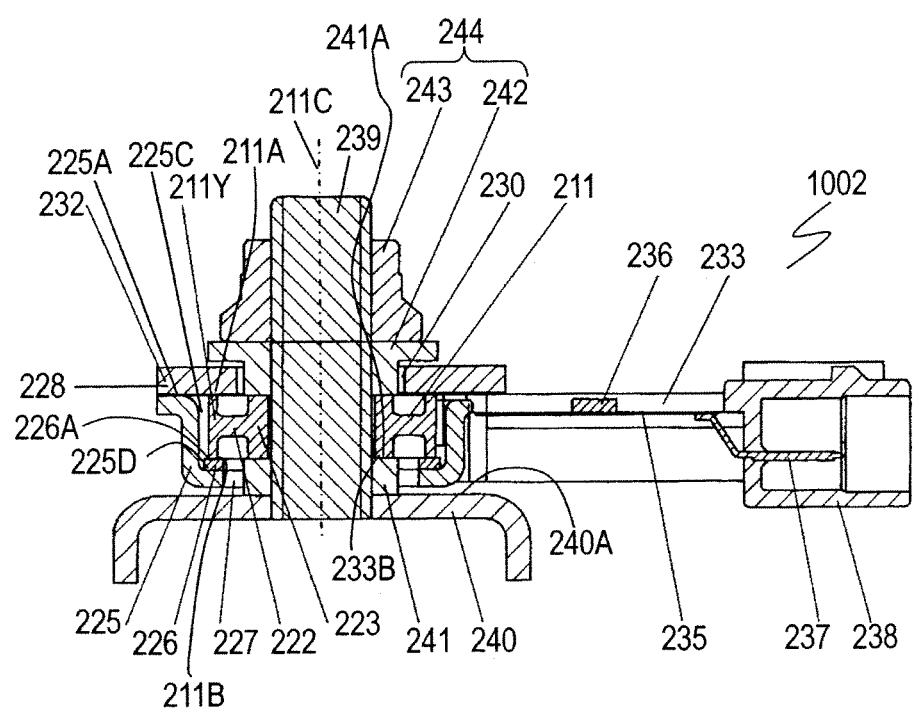
FIG. 13 is a side sectional view of the weight sensor according to Embodiment 2.
Figure 14:
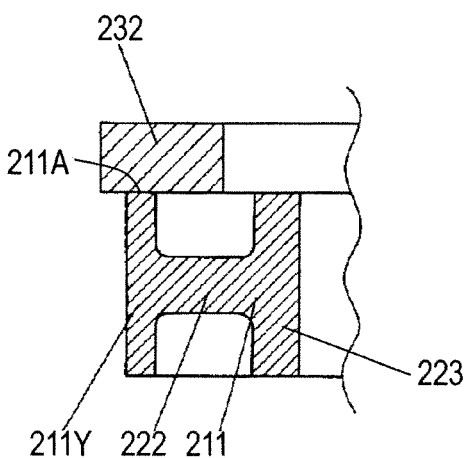
FIG. 14 is a side sectional view of the weight sensor according to Embodiment 2.
Figure 15:
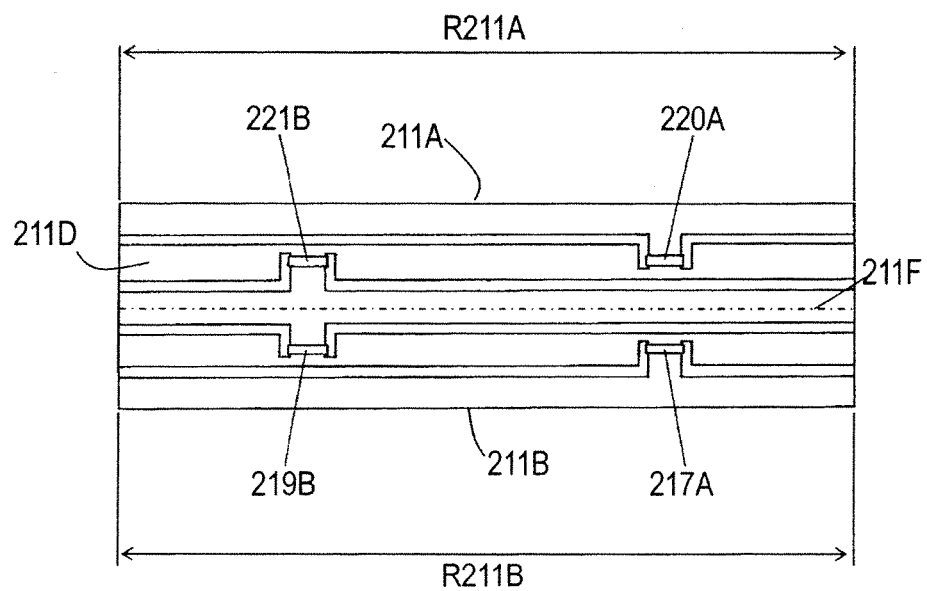
FIG. 15 is a side view of the weight sensor according to Embodiment 2.

An operation of weight sensor 1002 according to Embodiment 2 will be described below. FIG. 13 is a side sectional view of weight sensor 1002. FIG. 14 is an enlarged side sectional view of weight sensor 1002 for illustrating deformable body 211 and pressing member 232. FIG. 15 is a side view of deformable body 211.

As shown in FIG. 13, collar 241 is attached to an outer periphery of bolt 239 on upper surface 240A of support plate 240 into which bolt 239 is previously installed. Deformable body 211 is placed so that lower surface 233B of retained portion 223 contacts upper surface 241A of collar 241. Then, collar 242 is placed on upper surface 223A of retained portion 223. Then, nut 243 is screwed onto bolt 239 so that retained portion 223 is sandwiched between collars 241 and 242. Bolt 239, support plate 240, collars 241 and 242, and nut 243 together constitute fixing member 244 for fixing deformable body 211. In this situation, as shown in FIGS. 14 and 15, pressing member 232 contacts tubular portion 211Y of deformable body 211, but no load is applied to deformable body 211.

Predetermined voltages (5V according to Embodiment 2) are applied to power supply electrodes 212 and 213, and GND electrode 216 is grounded.

Figure 16:
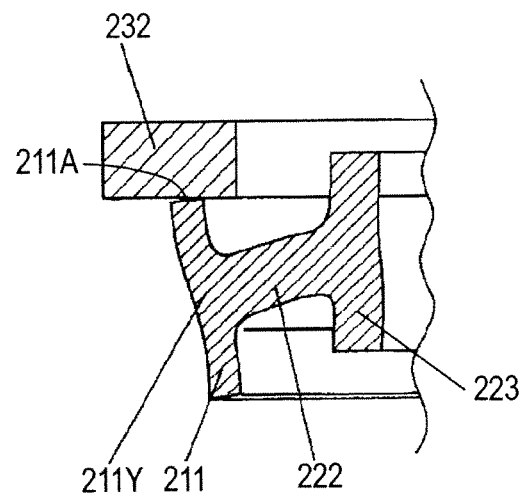
FIG. 16 is a side sectional view of the weight sensor according to Embodiment 2.
Figure 17:
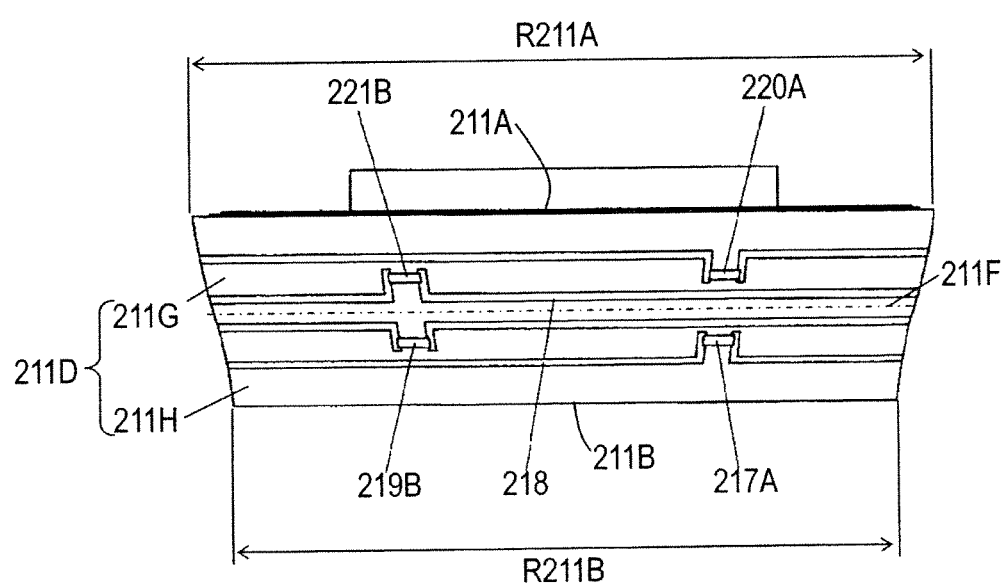
FIG. 17 is a side view of the weight sensor according to Embodiment 2.

FIG. 16 is an enlarged side sectional view of weight sensor 1002 while pressing member 232 applies a load to deformable body 211. When applied with a load along center axis 211C from above, pressing member 232 presses upper end 211A of tubular portion 211Y downward, and applies a shear load parallel to center axis 211C to tubular portion 211Y of deformable body 211. More specifically, pressing member 232 presses deformable body 211 in parallel with center axis 211C so that tubular portion 211Y and projection 222 are urged and displaced in directions relatively opposite to each other. This shear load applies a moment to outer side surface 211D of tubular portion 211Y linked to projection 222. The moment increases radius R211A of upper end 211A of deformable body 211 as shown in FIG. 17. The moment displaces upper end 211A and lower end 211B of tubular portion 211Y in directions relatively opposite to each other in a radial direction about center axis 211C. The increase in radius R211A of upper end 211A of tubular portion 211Y of deformable body 211 expands upper outer side surface 211G of outer side surface 211D. This results in an increase in the resistances of upper-side strain resistors 220 and 221 (strain resistor elements 220A, 220B, 221A, and 221B) provided on upper outer side surface 211G of outer side surface 211D. This changes the voltage between output electrodes 214 and 215 of the bridge circuit which is composed of strain resistors 217, 219, 220, and 221 shown in FIG. 12. The voltage is processed by processing circuit 236 so as to measure the load applied to deformable body 211.

As described above, in weight sensor 1002 of Embodiment 2, pressing member 232 for pressing projection 222 of deformable body 211 moves along center axis 211C of deformable body 211, thereby applying a moment to deformable body 211. This causes outer side surface 211D of deformable body 211 to easily deform. As a result, the resistances of strain resistors 217 and 219 provided on outer side surface 211D are easily changed so as to greatly change the voltage between output electrodes 214 and 215 of the bridge circuit. This increases the sensitivity of a signal to be output from weight sensor 1002.

Exemplary Embodiment 3

Figure 18:
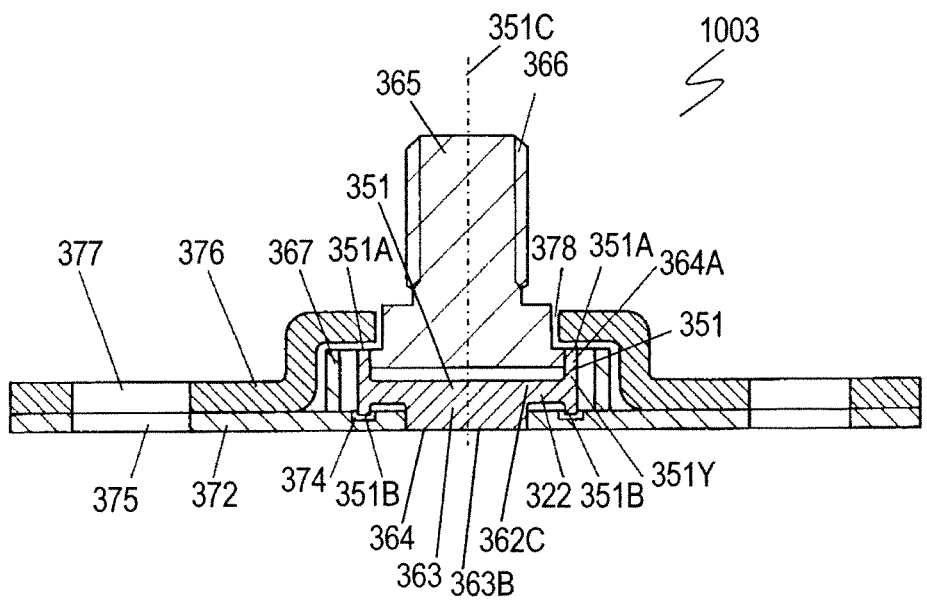
FIG. 18 is a side sectional view of a weight sensor according to Exemplary Embodiment 3 of the present invention.
Figure 19:
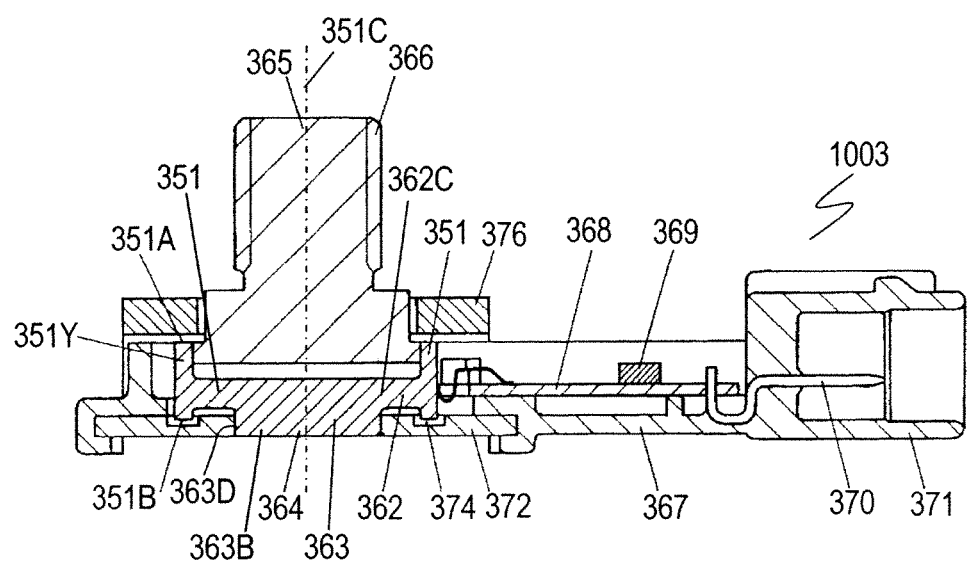
FIG. 19 is a side sectional view of the weight sensor according to Embodiment 3.
Figure 20A:
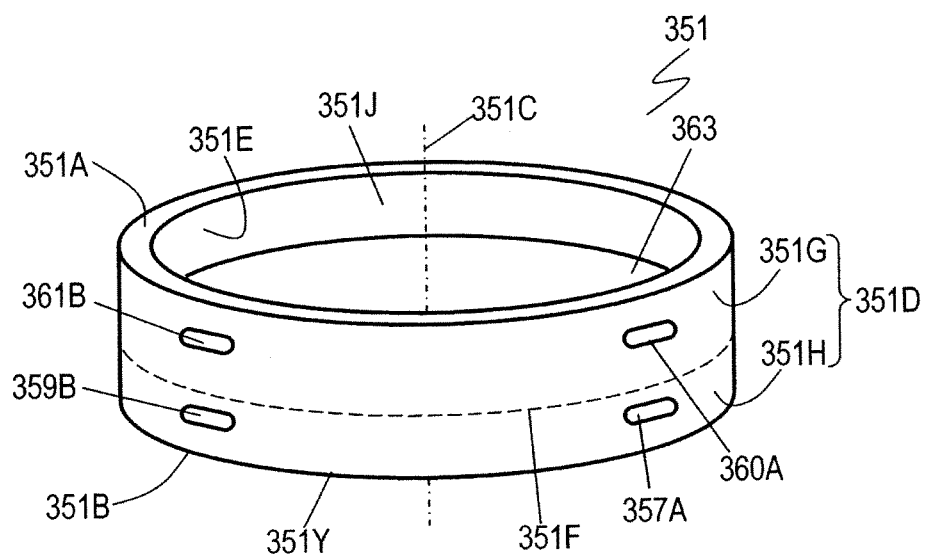
FIG. 20A is a perspective view of a deformable body of the weight sensor according to Embodiment 3.
Figure 20B:
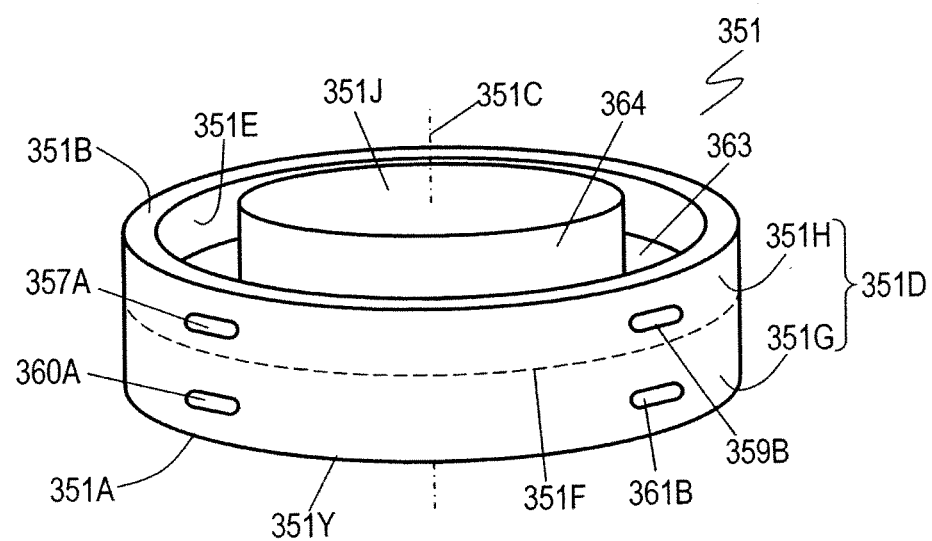
FIG. 20B is a bottom perspective view of the deformable body shown in FIG. 20A.
Figure 20C:
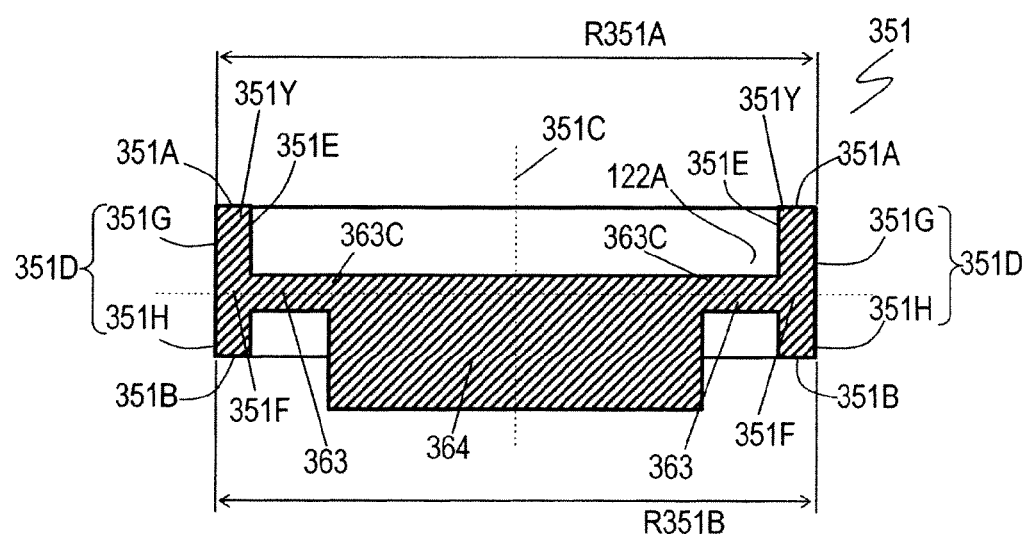
FIG. 20C is a sectional view of the deformable body shown in FIG. 20A.
Figure 20D:
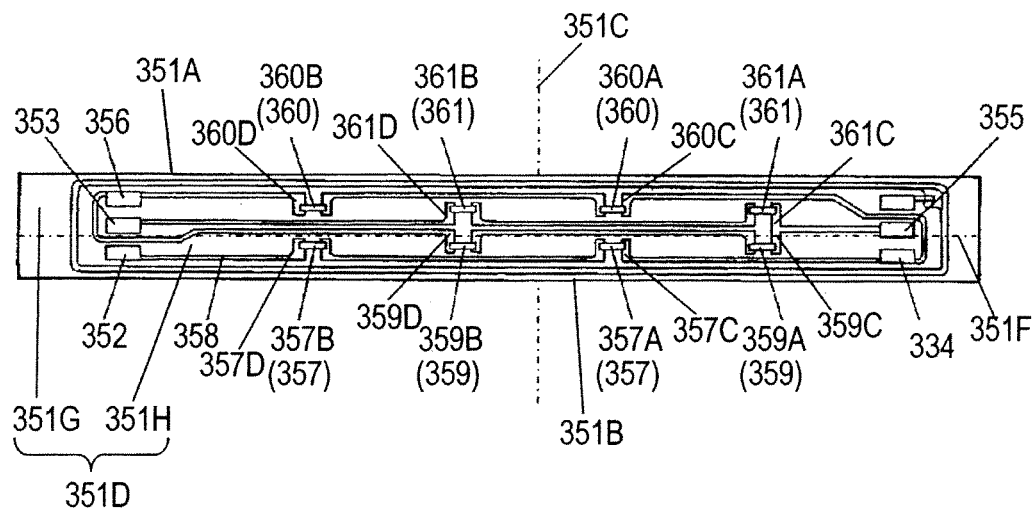
FIG. 20D is a developed view of a tubular portion of the deformable body of the weight sensor according to Embodiment 3.

FIGS. 18 and 19 are side sectional views of weight sensor 1003 according to Exemplary Embodiment 3 of the present invention. FIGS. 20A and 20B are a perspective view and a bottom perspective view of deformable body 351 of weight sensor 1003, respectively. FIG. 20C is a sectional view of deformable body 351. FIG. 20D is a developed view of tubular portion 351Y of deformable body 351.

As shown in FIGS. 20A to 20C, deformable body 351 includes tubular portion 351Y having a tubular shape (a circular cylindrical shape according to Embodiment 3) extending along and around center axis 351C. According to Embodiment 3, deformable body 351 is disposed so that center axis 351C extends in a vertical direction. Tubular portion 351Y has upper end 351A and lower end 351B which are opposite to each other along center axis 351C. Tubular portion 351Y has outer side surface 351D on the outside of the cylindrical shape, and inner surface 351E which is opposite to outer side surface 351D and which faces center axis 351C. Deformable body 351 further includes projection 362 projecting from inner surface 351E of tubular portion 351Y toward center axis 351C. Deformable body 351 is made of a plate made of a hard but deformable material, and a surface having an insulating property. At least outer side surface 351D has an insulating property. According to Embodiment 3, deformable body 351 is made of a metal plate, such as a ferrite stainless steel plate, and a glass layer formed on a surface (outer side surface 351D) of the metal plate. Power supply electrodes 352 and 353, output electrodes 354 and 355, and ground (GND) electrode 356 provided on outer side surface 351D are disposed close to each other and are made of Ag. In tubular portion 351Y, the position which is between upper and lower ends 351A and 351B and at which tubular portion 351Y crosses a surface perpendicular to center axis 351C is defined as intermediate circumference 351F. According to Embodiment 3, ends 351A and 351B are perpendicular to center axis 351C, and intermediate circumference 351F is closer to end 351B than to end 351A. Intermediate circumference 351F divides outer side surface 351D of tubular portion 351Y into upper outer side surface 351G and lower outer side surface 351H. In other words, upper outer side surface 351G is located between intermediate circumference 351F and upper end 351A. Lower outer side surface 351H is located between intermediate circumference 351F and lower end 351B.

Projection 362 projects toward center axis 351C from inner surface 351E of intermediate circumference 351F of tubular portion 351Y Lower-side strain resistors 357 and 359 are provided on lower outer side surface 351H. Lower-side strain resistor 357 has ends 357C and 357D, and is composed of strain resistor elements 357A and 357B connected in series between ends 357C and 357D. Strain resistor elements 357A and 357B have resistances changing depending on the geometric distortion generated by a stress applied to the resistor elements. Therefore, the resistance between ends 357C and 357D of lower-side strain resistor 357 changes depending on the geometric distortion generated by the stress applied to strain resistor elements 357A and 357B, that is, strain resistor 357. Lower-side strain resistor 359 has ends 359C and 359D, and is composed of strain resistor elements 359A and 359B connected in series between ends 359C and 359D. Strain resistor elements 359A and 359B have resistances changing depending on the geometric distortion generated by a stress applied to the resistor elements. Therefore, the resistance between ends 359C and 359D of lower-side strain resistor 359 changes depending on the geometric distortion generated by the stress applied to strain resistor elements 359A and 359B, that is, strain resistor 359. End 357D of lower-side strain resistor 357 is electrically connected to power supply electrode 352 via circuit pattern 358, and end 357C is connected to output electrode 354 via circuit pattern 358. End 359C of lower-side strain resistor 359 is electrically connected to output electrode 355 via circuit pattern 358, and end 359D is electrically connected to GND electrode 356 via circuit pattern 358.

Upper-side strain resistors 360 and 361 are provided on upper outer side surface 351G. Upper-side strain resistor 360 has ends 360C and 360D, and is composed of strain resistor elements 360A and 360B connected in series between ends 360C and 360D. Strain resistor elements 360A and 360B have resistances changing depending on the geometric distortion generated by a stress applied to the resistor elements. Therefore, the resistance between ends 360C and 360D of upper-side strain resistor 360 changes depending on the geometric distortion generated by the stress applied to strain resistor elements 360A and 360B, that is, strain resistor 360. Upper-side strain resistor 361 has ends 361C and 361D, and is composed of strain resistor elements 361A and 361B connected in series between ends 361C and 361D. Strain resistor elements 361A and 361B have resistances changing depending on the geometric distortion generated by a stress applied to the resistor elements. Therefore, the resistance between ends 361C and 361D of upper-side strain resistor 361 changes depending on the geometric distortion generated by the stress applied to strain resistor elements 361A and 361B, that is, strain resistor 361. End 360D of upper-side strain resistor 360 is electrically connected to GND electrode 356 via circuit pattern 358, and end 360C is connected to output electrode 354 via circuit pattern 358. End 361D of upper-side strain resistor 361 is electrically connected to power supply electrode 353 via circuit pattern 358, and end 361C is electrically connected to output electrode 355 via circuit pattern 358. Lower-side strain resistors 357 and 359 and upper-side strain resistors 360 and 361 together constitute a bridge circuit.

Strain resistor elements 357A and 357B and strain resistor elements 359A and 359B are arranged alternately in a circumferential direction of outer side surface 351D of deformable body 351 perpendicular to center axis 351C. In other words, strain resistor element 357A is located between strain resistor elements 359A and 359B, and strain resistor element 359A is located between strain resistor elements 357A and 357B in the circumferential direction of outer side surface 351D. Strain resistor element 357B is located between strain resistor elements 359A and 359B, and strain resistor element 359B is located between strain resistor elements 357A and 357B in the circumferential direction of outer side surface 351D.

Strain resistor elements 360A and 360B and strain resistor elements 361A and 361B are arranged alternately in the circumferential direction of outer side surface 351D of deformable body 351 perpendicular to center axis 351C. In other words, strain resistor element 360A is located between strain resistor elements 361A and 361B, and strain resistor element 361A is located between strain resistor elements 360A and 360B in the circumferential direction of outer side surface 351D. Strain resistor element 360B is located between strain resistor elements 361A and 361B, and strain resistor element 361B is located between strain resistor elements 360A and 360B in the circumferential direction of outer side surface 351D. As shown in FIG. 20D, strain resistor elements 360A, 360B, 361A, and 361B are located above strain resistor elements 357A, 357B, 359A, and 359B, respectively, that is, in a direction parallel to center axis 351C.

Deformable body 351 further includes retained portion 363 provided at tip 362C of projection 362. Retained portion 363 has a larger width in the direction of center axis 351C than projection 362, and projects downward from projection 362 toward lower end 351B. Retained portion 363 and projection 362 together constitute fixing part 364.

Deformable body 351 has a retained portion provided on inner surface 351E at upper end 351A of tubular portion 351Y. Weight sensor 1003 includes pressing member 365 made of metal which is fixed to upper end 351A of tubular portion 351Y, that is, to fixing part 364A. Screw 366 is provided on outer side surface of pressing member 365. Case 367 made of resin accommodates circuit board 368 made of polyimide.

Circuit board 368 shown in FIG. 19 is electrically connected to power supply electrodes 352 and 353, output electrodes 354 and 355, and GND electrode 356 which are provided on outer side surface 351D of deformable body 351. Processing circuit 369 implemented by an integrated circuit (IC) is mounted onto circuit board 368. Processing circuit 369 processes signals output from output electrodes 354 and 355 of the bridge circuit which is composed of lower-side strain resistors 357 and 359, upper-side strain resistors 360 and 361, and circuit pattern 358 formed on deformable body 351. Case 367 includes connector part 371 having connector terminals 370. Connector terminals 370 are electrically connected to circuit board 368 output signals outside.

Figure 22:
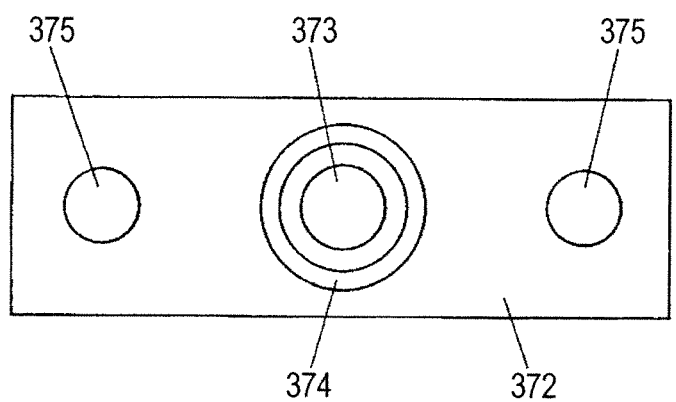
FIG. 22 is a top view of a mounting member of the weight sensor according to Embodiment 3.

FIG. 22 is a top view of mounting member 372 of weight sensor 1003. Mounting member 372 has fixing hole 373 therein. Retained portion 363 of deformable body 351, that is, outer side surface 363D of lower end 363B of fixing part 364 is fixed in fixing hole 373. Mounting member 372 has stopper groove 374 therein having a circular shape surrounding fixing hole 373. When an excessive pressing load is applied to pressing member 365 and causes tubular portion 351Y to move downward, the inner bottom surface of stopper groove 374 contacts lower end 351B of tubular portion 351Y.

More specifically, lower end 351B of tubular portion 351Y contacts mounting member 372, thereby preventing tubular portion 351Y from being displaced downward with respect to mounting member 372. This eliminates the need to provide a stopper to mounting member 372 by a mechanical processing, such as cutting or forging, thereby eliminating the process of mechanically processing the stopper.

Since the inner bottom surface of stopper groove 374 can contact lower end 351B of tubular portion 351Y, the thickness of weight sensor 1003 can be smaller by the amount corresponding to the depth of stopper groove 374.

Figure 23:
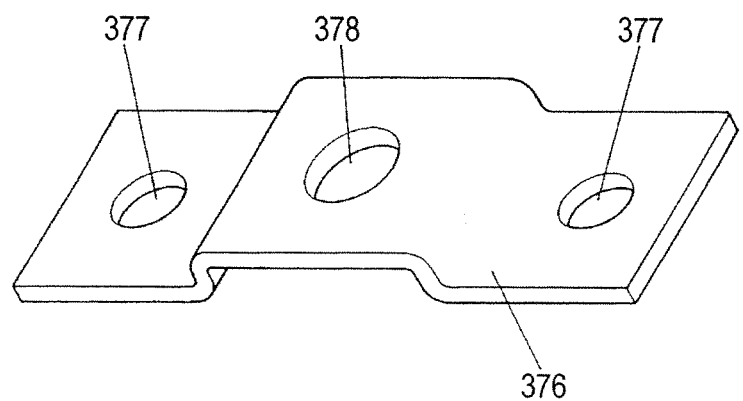
FIG. 23 is a perspective view of the mounting member of the weight sensor according to Embodiment 3.

FIG. 23 is a perspective view of mounting member 376 of weight sensor 1003. Mounting member 372 has two mounting holes 375 therein. Mounting member 376 is fixedly welded at both ends to mounting member 372. Mounting member 376 has two mounting holes 377 therein corresponding to two mounting holes 375 of mounting member 372.

Through-hole 378 is provided substantially in a center of mounting member 376 for passing pressing member 365 therethrough. The center of mounting member 376 protrudes a direction to upper end 351A of tubular portion 351Y.

When an excessive tensile load is applied to pressing member 365 and causes tubular portion 351Y to move upward, upper end 351A of tubular portion 351Y contacts mounting member 376 so as to prevent tubular portion 351Y from being displaced upward with respect to mounting member 376. This eliminates the need to provide a stopper to mounting member 376 by mechanical processing, such as cutting or forging, thereby eliminating the process of mechanically processing the stopper.

A method for manufacturing weight sensor 1003 of Embodiment 3 will be described below.

Deformable body 351 is manufactured using the same materials and methods as deformable body 111 and strain resistors 117, 119, 120, and 121 of Embodiment 1. Deformable body 351 includes strain resistors 357, 359, 360, and 361; power supply electrodes 352 and 353; output electrodes 354 and 355; GND electrode 356; and circuit pattern 358 on outer side surface 351D.

Next, circuit board 368 is placed on case 367 in which connector terminals 370 are previously embedded and molded by insert molding. Then, processing circuit 369 is mounted on circuit board 368, thereby being electrically connected to connector terminals 370.

Next, pressing member 365 is fixedly welded to fixing part 364A of upper end 351A of tubular portion 351Y.

Next, fixing part 364 of retained portion 363 of deformable body 351 is inserted into fixing hole 373 of mounting member 372, and fixedly welded to the fixing hole.

Then, both ends of mounting member 376 are placed at both ends of the upper surface of mounting member 372, and fixedly welded thereto.

Figure 24:
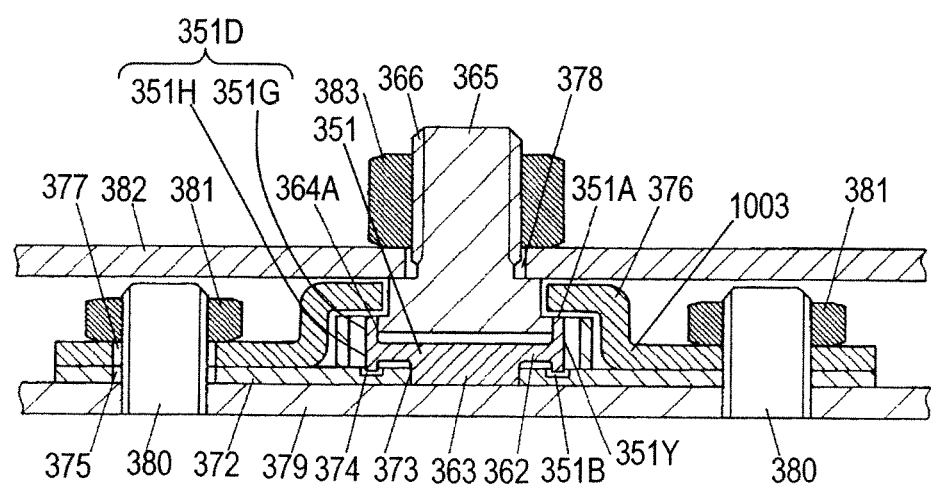
FIG. 24 is a side sectional view of the weight sensor according to Embodiment 3.
Figure 25:
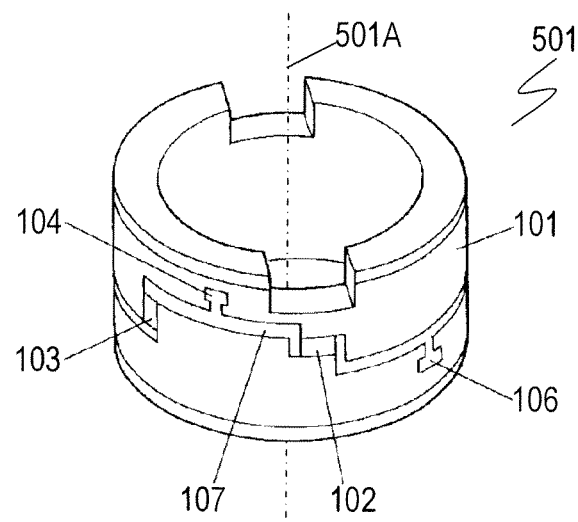
FIG. 25 is a perspective view of a conventional weight sensor.
Figure 26:
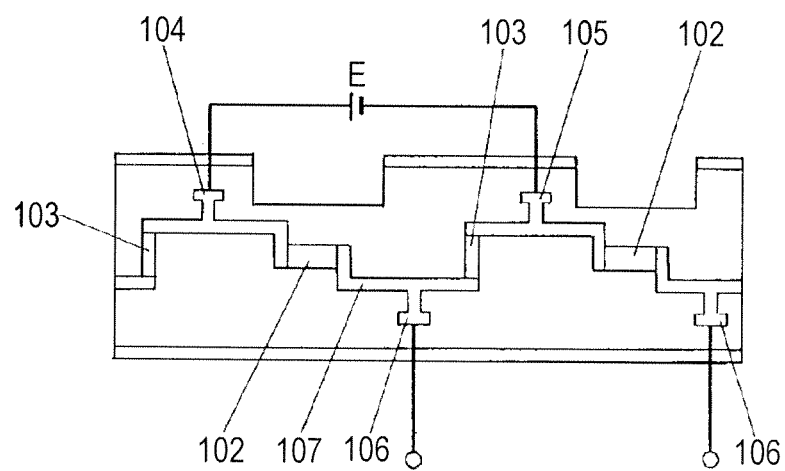
FIG. 26 is a developed view of a deformable body of the conventional weight sensor.
Figure 27:
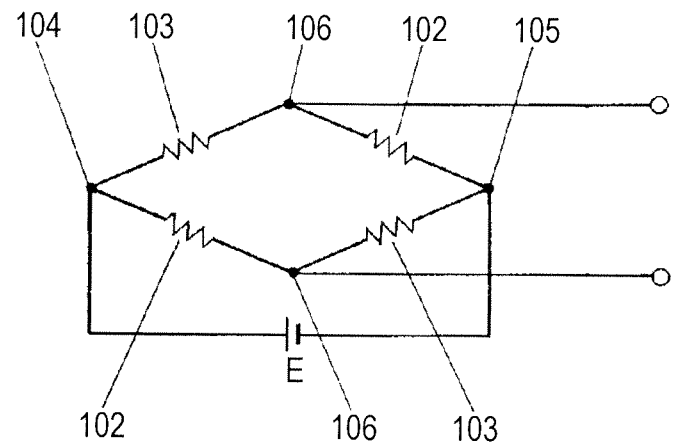
FIG. 27 is a circuit diagram of the conventional weight sensor.
Figure 28:
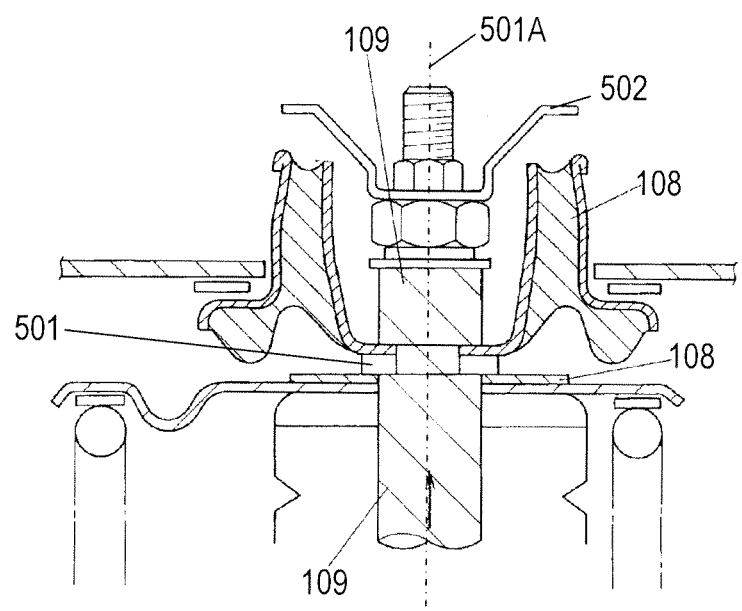
FIG. 28 is a side sectional view of the conventional weight sensor.
Figure 29:
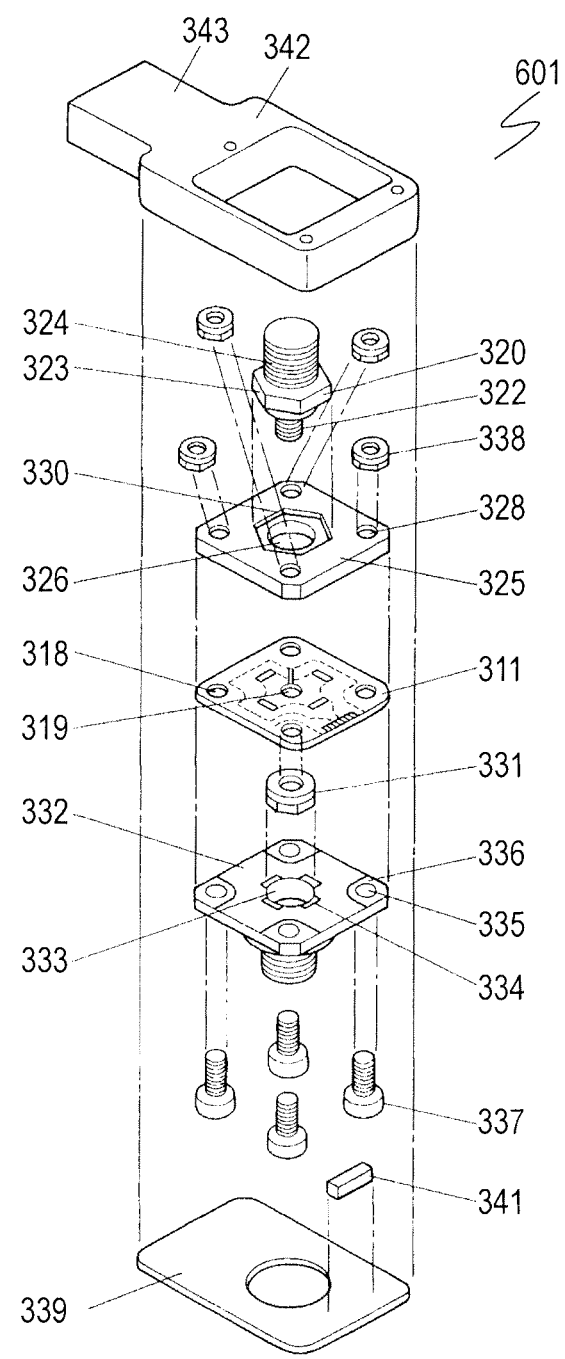
FIG. 29 is an exploded perspective view of another conventional weight sensor.
Figure 30:
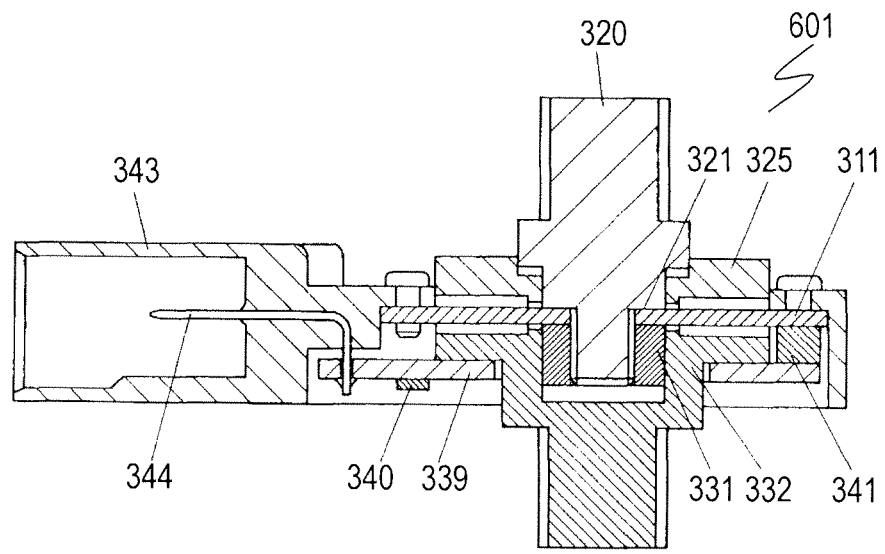
FIG. 30 is a side sectional view of the conventional weight sensor shown in FIG. 29.
Figure 31:
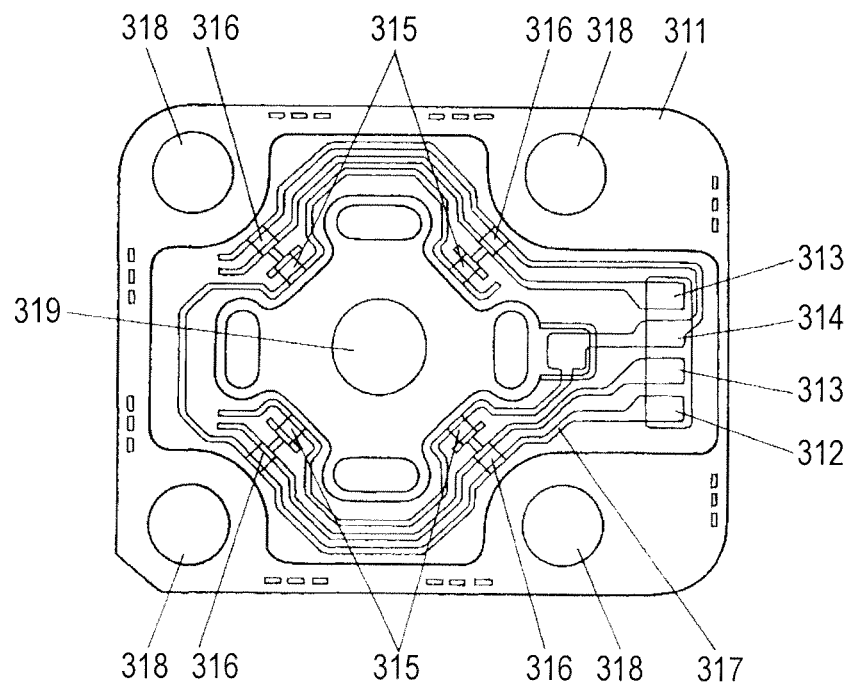
FIG. 31 is a bottom view of an insulating board of the conventional weight sensor shown in FIG. 29.
Figure 32:
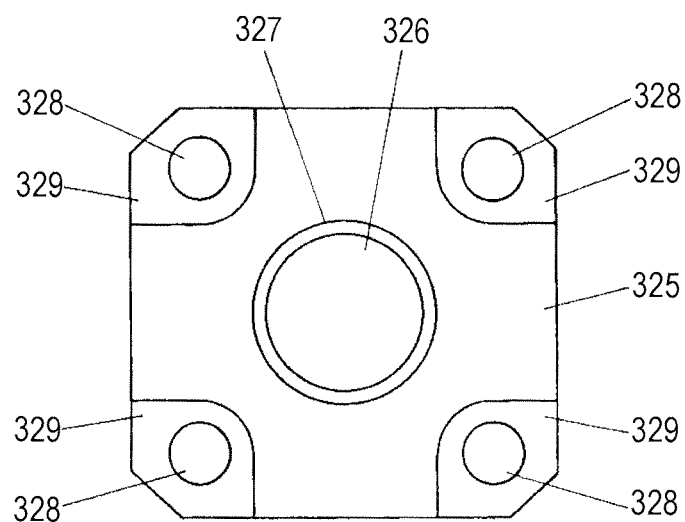
FIG. 32 is a bottom view of a mounting member of the conventional weight sensor shown in FIG. 29.
Figure 33:
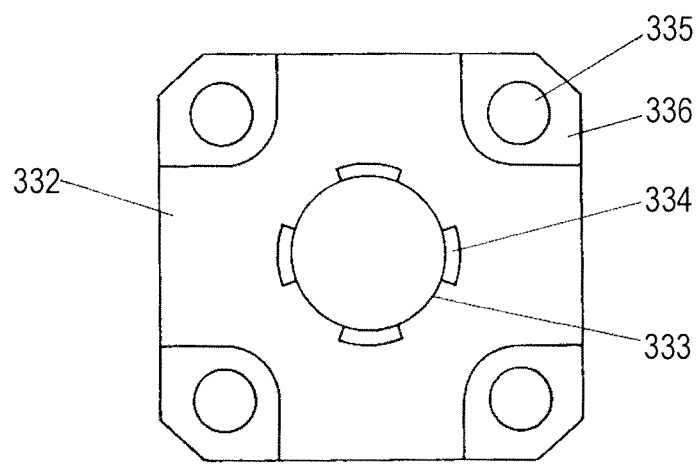
FIG. 33 is a top view of another mounting member of the conventional weight sensor shown in FIG. 29.

An operation of weight sensor 1003 will be described below. FIG. 24 is a side sectional view of weight sensor 1003.

Weight sensor 1003 is placed on the upper surface of sheet rail 379 such that bolts 380 passes through mounting holes 375 of mounting member 372 and mounting holes 377 of mounting member 376. Then, nuts 381 are screwed onto bolts 380 so as to fix weight sensor 1003 to sheet rail 379. Then, coupler 382 linked to a vehicle seat is attached to pressing member 365 via bolt 383.

Figure 21:
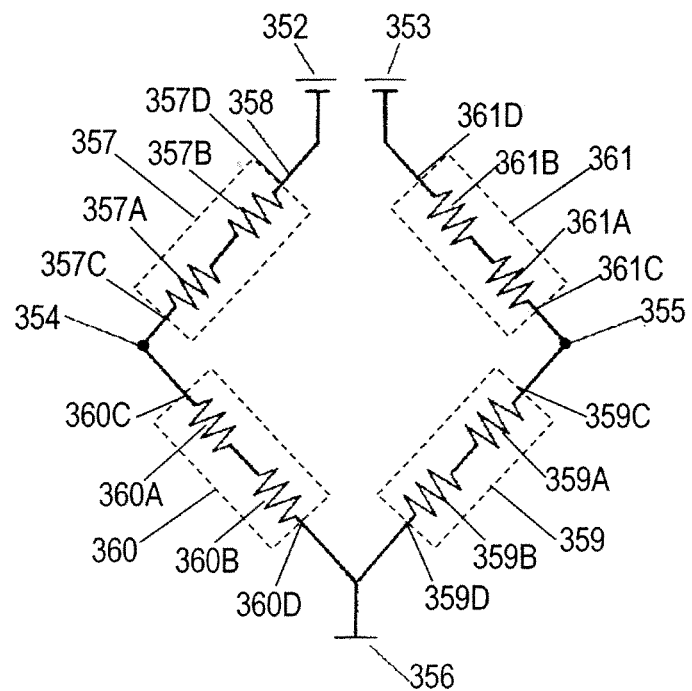
FIG. 21 is a circuit diagram of the weight sensor according to Embodiment 3.

In this situation, when a passenger sits on the seat, a load is applied to coupler 382 from above, and consequently, a shear load is applied to tubular portion 351Y. The shear load applies a moment to outer side surface 351D of tubular portion 351Y. The moment expands upper outer side surface 351G of outer side surface 351D of tubular portion 351Y. This results in an increase in the resistances of upper-side strain resistors 360 and 361 (strain resistor elements 360A, 360B, 361A, and 361B). The moment also contracts lower outer side surface 351H of outer side surface 351D, thereby reducing the resistances of lower-side strain resistors 357 and 359 (strain resistor elements 357A, 357B, 359A, and 359B). This changes the voltage between output electrodes 354 and 355 of the bridge circuit which is composed of strain resistors 357, 359, 360, and 361 shown in FIG. 21. The voltage is processed by processing circuit 369 so as to measure the load applied to deformable body 351.

When a lifting load is applied to coupler 382, upper outer side surface 351G of outer side surface 351D of tubular portion 351Y is contracted so as to reduce the resistances of upper-side strain resistors 360 and 361. Simultaneously, lower outer side surface 351H of outer side surface 351D is expanded so as to increase the resistances of lower-side strain resistors 357 and 359. This changes the voltage between output electrodes 354 and 355 of the bridge circuit which is composed of strain resistors 357, 359, 360, and 361 shown in FIG. 21. The voltage is processed by processing circuit 369 so as to measure the load applied to deformable body 351.

As described above, mounting member 372 fixes deformable body 351. Deformable body 351 includes retained portion 363 provided at tip 362C of projection 362. Retained portion 363 of deformable body 351 is fixed to mounting member 372. Mounting member 372 has an upper surface facing lower end 351B of tubular portion 351Y. When no load is applied to pressing member 365, the upper surface of mounting member 372 is located away from upper end 351A of tubular portion 351Y. Upon an excessive load being applied to pressing member 365, the upper surface of mounting member 372 contacts lower end 351B of tubular portion 351Y so as to prevent tubular portion 351Y from being displaced downward. Mounting member 376 is joined to mounting member 372 and has a lower surface faces upper end 351A of tubular portion 351Y. When no load is applied to pressing member 365, the lower surface of mounting member 376 is located away from upper end 351A of tubular portion 351Y. When an excessive load is applied to pressing member 365, the lower surface of mounting member 372 contacts upper end 351A of tubular portion 351Y so as to prevent tubular portion 351Y from being displaced upward. The upper surface of mounting member 372 has stopper groove 374 therein having an inner bottom surface contacting lower end 351B of tubular portion 351Y when an excessive load is applied to pressing member 365.

When coupler 382 applies an excessive pressing load to pressing member 365 from above, lower end 351B of tubular portion 351Y contacts the inner bottom surface of stopper groove 374, thereby preventing plastic deformation of tubular portion 351Y.

When coupler 382 applies an excessive tensile load to pressing member 365 to displace pressing member 365 upward, upper end 351A of tubular portion 351Y contacts the lower surface of mounting member 376, thereby preventing plastic deformation of tubular portion 351Y.

In Embodiments 1 to 3, terms, such as "above", "lower", "upward", and "downward", indicating directions indicate relative directions depending from components, such as the deformable body, of the weight sensors, and do not indicate absolute directions, such as a vertical direction.

INDUSTRIAL APPLICABILITY

This weight sensor has resistances of strain resistors change so greatly to measure a load with high sensitivity and is useful especially to measure a load applied to a vehicle seat.

Reference Marks in the Drawings 111 deformable body
111A upper end
111B lower end
111C center axis
111D outer side surface
111E inner surface
111F intermediate circumference
111G upper outer side surface
111H lower outer side surface
111Y tubular portion
117 strain resistor (second strain resistor)
120 strain resistor (first strain resistor)
122 projection
124 elastic body (second elastic body)
128 elastic body (first elastic body)
132 support member
141 pressing member
211 deformable body
211A upper end
211B lower end
211C center axis
211D outer side surface
211E inner surface
211F intermediate circumference
211G upper outer side surface
211H lower outer side surface
211J through-hole
211Y tubular portion
217 strain resistor (second strain resistor)
220 strain resistor (first strain resistor)
222 projection
223 retained portion
232 pressing member
244 fixing member
351 deformable body
351A upper end
351B lower end
351Y tubular portion
362 projection
363 retained portion
372 mounting member (first mounting member)
374 stopper groove
376 mounting member (second mounting member)
1001 weight sensor
1002 weight sensor
1003 weight sensor

The invention claimed is:

1. A weight sensor comprising:
    a deformable body including
        a tubular portion having a tubular shape extending along a center axis and surrounding the center axis, the tubular portion having an outer side surface and an inner surface, the outer side surface facing in a direction away from the center axis, the inner surface facing the center axis, and
        a projection projecting from the inner surface of the tubular portion;
    a first strain resistor provided on the outer side surface of the deformable body; and
    a pressing member moving along the center axis so as to apply a load to the deformable body so as to apply a moment to the tubular portion of the deformable body.

2. The weight sensor of claim 1, wherein the pressing member presses the deformable body to urge the projection and the tubular portion of the deformable body relatively in directions which are opposite to each other and which are parallel with the center axis.

3. The weight sensor of claim 1, further comprising
    a support member for supporting the deformable body,
    wherein the tubular portion of the deformable body has an upper end and a lower end opposite to each other along the center axis,
    wherein the support member supports the upper end and the lower end of the deformable body, and
    wherein the pressing member presses the projection so as to apply the moment to the tubular portion.

4. The weight sensor of claim 3, further comprising
    a first elastic body provided between the support member and the upper end of the tubular portion of the deformable body.

5. The weight sensor of claim 4, further comprising a second elastic body provided between the support member and the lower end of the tubular portion of the deformable body.

6. The weight sensor of claim 1, further comprising a fixing member for fixing the deformable body,
wherein the tubular portion of the deformable body has an upper end and a lower end opposite to each other along the center axis,
wherein the tubular portion of the deformable body has an upper end and a lower end opposite to each other along the center axis,
wherein the deformable body further includes a retained portion provided at a tip of the projection,
wherein the fixing member fixes the retained portion of he deformable body, and
wherein the pressing member presses the tubular portion of the deformable body such that the moment is applied to the tubular portion of the deformable body.

7. The weight sensor of claim 1, further comprising a second strain resistor formed on the outer side surface of the deformable body,
wherein an intermediate circumference at which the tubular portion crosses a surface perpendicular to the center axis between the upper end and the lower end of the tubular portion is defined,
wherein the intermediate circumference divides the outer side surface of the tubular portion into an upper outer side surface and a lower outer side surface,
wherein the first strain resistor and the second strain resistor are disposed on the upper outer side surface and the lower outer side surface, respectively, and
wherein the projection of the deformable body projects from the intermediate circumference on the inner surface of the tubular portion.

8. The weight sensor of claim 1, further comprising a first mounting member for fixing the deformable body,
wherein the deformable body further includes a retained portion provided at a tip of the projection,
wherein the retained portion of the deformable body is fixed to the first mounting member,
wherein the tubular portion of the deformable body has an upper end and a lower end opposite to each other along the center axis,
wherein the first mounting member has an upper surface facing the lower end of the tubular portion,
wherein, when no load is applied to the pressing member, the upper surface of the first mounting member is located away from the upper end of the tubular portion, and
wherein, when an excessive load is applied to the pressing member, the upper surface of the first mounting member contacts the lower end of the tubular portion so as to prevent the tubular portion from being displaced downward.

9. The weight sensor of claim 8, further comprising:
a second mounting member joined to the first mounting member, the second mounting member having a lower surface facing the upper end of the tubular portion,
wherein, when no load is applied to the pressing member, the lower surface of the second mounting member is located from the upper end of the tubular portion, and
wherein, when an excessive load is applied to the pressing member, the lower surface of the second mounting member contacts the upper end of the tubular portion so as to prevent the tubular portion from being displaced upward.

10. The weight sensor of claim 8, wherein a stopper groove is provided in the upper surface of the first mounting member, and the stopper groove has an inner bottom surface which contacts the lower end of the tubular portion when the excessive load is applied to the pressing member.

11. The weight sensor of claim 1, further comprising:
a first mounting member for fixing the deformable body; and
a second mounting member joined to the first mounting member,
wherein the deformable body further includes a retained portion provided at a tip of the projection,
wherein the retained portion of the deformable body is fixed to the first mounting member,
wherein the tubular portion of the deformable body has an upper end and a lower end opposite to each other along the center axis,
wherein the second mounting member has a lower surface facing the upper end of the tubular portion,
wherein, when no load is applied to the pressing member, the lower surface of the second mounting member is located from the upper end of the tubular portion, and
wherein, when an excessive load is applied to the pressing member, the lower surface of the second mounting member contacts the upper end of the tubular portion so as to prevent the tubular portion from being displaced upward.

* * * * *